US007729102B2

United States Patent
Kuriyama

(10) Patent No.: US 7,729,102 B2
(45) Date of Patent: Jun. 1, 2010

(54) SOLID ELECTROLYTIC CAPACITOR AND STRUCTURE FOR MOUNTING THIS SOLID ELECTROLYTIC CAPACITOR ON BOARD

(75) Inventor: Chojiro Kuriyama, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 475 days.

(21) Appl. No.: 11/792,888

(22) PCT Filed: Dec. 1, 2005

(86) PCT No.: PCT/JP2005/022089

§ 371 (c)(1),
(2), (4) Date: Jun. 12, 2007

(87) PCT Pub. No.: WO2006/064669

PCT Pub. Date: Jun. 22, 2006

(65) Prior Publication Data

US 2008/0094812 A1    Apr. 24, 2008

(30) Foreign Application Priority Data

Dec. 16, 2004  (JP) .............................. 2004-364451

(51) Int. Cl.
*H01G 9/00* (2006.01)

(52) U.S. Cl. ...................... 361/523; 361/525; 361/528; 361/529; 361/516; 361/519

(58) Field of Classification Search ................. 361/523, 361/525, 528–541, 516–519; 29/25.01, 25.03
See application file for complete search history.

(56) References Cited

U.S. PATENT DOCUMENTS

| | | | |
|---|---|---|---|
| 6,188,566 B1 * | 2/2001 | Aoyama | 361/534 |
| 6,430,034 B2 * | 8/2002 | Sano et al. | 361/528 |
| 6,493,214 B1 * | 12/2002 | Kanetake et al. | 361/531 |
| 6,625,009 B2 * | 9/2003 | Maeda | 361/528 |
| 6,717,793 B2 * | 4/2004 | Arai et al. | 361/306.1 |
| 6,741,451 B2 * | 5/2004 | Aoyama | 361/528 |
| 6,819,546 B2 * | 11/2004 | Kuriyama | 361/535 |
| 6,912,117 B2 * | 6/2005 | Arai et al. | 361/523 |
| 7,139,163 B2 * | 11/2006 | Sawano | 361/540 |
| 7,167,357 B2 * | 1/2007 | Goldberger | 361/523 |
| 2004/0103508 A1 | 6/2004 | Kanetake | |

FOREIGN PATENT DOCUMENTS

| | | |
|---|---|---|
| JP | 58-53818 | 3/1983 |
| JP | 61-276210 | 12/1986 |
| JP | 62-89129 | 6/1987 |
| JP | 2-268490 | 11/1990 |
| JP | 5-55090 | 3/1993 |
| JP | 10-4032 | 1/1998 |
| JP | 11-288845 | 10/1999 |
| JP | 2000-223363 | 8/2000 |
| JP | 2003-163137 | 6/2003 |
| JP | 2005-56970 | 3/2005 |

OTHER PUBLICATIONS

International Search Report from the corresponding PCT/JP2005/022089, mailed Mar. 7, 2006.
Japanese Office from the corresponding 2004-364451, mailed Nov. 6, 2007.

\* cited by examiner

*Primary Examiner*—Nguyen T Ha
(74) *Attorney, Agent, or Firm*—Hamre, Schumann, Mueller & Larson, P.C.

(57) ABSTRACT

A solid electrolytic capacitor 1 includes a capacitor element 2 and a resin package 9 enclosing the capacitor element. The capacitor element includes a sintered body 3 of valve metal powder, an anode 4a provided by embedding an anode wire 4 in the sintered body, and a cathode 5 provided by forming a metal layer on the sintered body. A first lead member 6 in the form of a plate is connected to the anode wire 4. The end of the first lead member projects from a side surface 9a of the resin package 9 to provide an anode terminal T1. A second lead member 7 in the form of a plate is connected to the cathode 5. The end of the second lead member projects from a side surface 9b of the resin package 9 to provide a cathode terminal T2. By extending the first and the second lead members 6 and 7 generally horizontally at the substantially same height from the lower end of the resin package and making the portions projecting from the resin package 9 serve as the anode terminal T1 and the cathode terminal T2, the lead length between the anode 4a of the capacitor element 2 and the anode terminal T1 and the lead length between the cathode 5 and the cathode terminal T2 is made as short as possible, whereby ESL is reduced.

9 Claims, 14 Drawing Sheets

PRIOR ART

SOLID ELECTROLYTIC CAPACITOR AND STRUCTURE FOR MOUNTING THIS SOLID ELECTROLYTIC CAPACITOR ON BOARD

TECHNICAL FIELD

The present invention relates to a solid electrolytic capacitor made by using a sintered body of valve metal powder, and to a structure for mounting the solid electrolytic capacitor on a board.

BACKGROUND-ART

In a power supply circuit for an IC (Integrated Circuit) such as a CPU (Control Processing Unit) of a computer, high frequency noise is generated due to the high-speed processing of the IC. In light of this, a bypass capacitor for removing high-frequency noise from the power supply circuit is often provided in the power supply line for the IC. The bypass capacitor fulfills the decoupling function of preventing noise transmission from the power supply circuit to the IC and the stabilizing function of preventing the fluctuation of power supply voltage by temporarily supplementing or storing current when the load current changes largely. For such a bypass capacitor, use may be made of a ceramic capacitor or a tantalum capacitor.

Recently, with the speed increase of an IC, a bypass capacitor having a large capacitance, a low ESL (Equivalent Series Inductance) and a high responsibility is in demand. Also for a chip-type solid electrolytic capacitor using a sintered body of valve metal powder such as a tantalum capacitor, further decrease of the ESL is needed.

As compared with a chip ceramic capacitor, to increase the capacitance of a solid electrolytic capacitor is relatively easy. However, in a conventional chip-type solid electrolytic capacitor, the capacitor element, which substantially acts as a capacitor, is enclosed in a resin package, and this requires leads for connecting the anode and the cathode of the capacitor element to an anode terminal and a cathode terminal provided outside the resin package. These leads, however, result in an equivalent series inductance (ESL), thereby putting a limitation on the amount of decrease in the ESL of conventional chip-type solid electrolytic capacitors.

FIG. 19 is a sectional view showing a conventional solid electrolytic capacitor configured to be mounted on the surface of a printed board.

The illustrated solid electrolytic capacitor 100 includes a capacitor element 101 in a prismatic form enclosed in a resin package 107 in the form of a rectangular parallelepiped. The lower surface 107c of the resin package 107 is the mount surface to be mounted on a printed board. The resin package 107 may be about 2 to 3 mm in length (lateral dimension in FIG. 19), about 1 to 2 mm in width, and about 1 to 2 mm in height. The mounting electrode (the end 105c of an anode terminal 105 and the end 106c of a cathode terminal 106 in FIG. 19), which is formed on the lower surface 107c of the resin package 107, may be about 0.8 mm in length (lateral dimension in FIG. 19).

The capacitor element 101 comprises a prismatic porous sintered body 102 made of valve metal, an anode wire 103 of about 0.2 mm in diameter partially embedded at the substantial center of a side surface 102a of the porous sintered body 102, and a metal layer 104 serving as a cathode (hereinafter referred to as a cathode 104 when necessary) and formed on surfaces other than the side surface 102a. The region between the portion of the anode wire 103 which is located within the porous sintered body (hereinafter, this portion is referred to as an anode 103a) and the cathode 104 functions as a capacitor.

To the portion 103b of the anode wire 103 which projects from the porous sintered body 102, the anode terminal 105 made of a conductive material and channel-shaped in section is connected to guide the anode 103a to the lower surface 107c of the resin package 107. To the metal layer 104 on the upper surface of the capacitor element 101, the cathode terminal 106 made of a conductive material and channel-shaped in section is connected to guide the cathode (the entire metal layer 104) of the capacitor element 101 to the lower surface 107c of the resin package 107.

The base end 105a of the anode terminal 105 serves as a connecting portion for connection with the lead portion 103b of the anode wire 103, whereas the end 105c of the anode terminal 105 serves as a connecting portion (hereinafter referred to as mount portion) for connection with an electrode on the mount surface of the printed board by e.g. soldering. The intermediate portion 105b of the anode terminal 105 serves as a lead portion for guiding the anode 103a of the capacitor element 101 to the mount portion 105c on the lower surface 107c of the resin package 107.

Similarly, the base end 106a of the cathode terminal 106 serves as a connecting portion for connection with the cathode 104, whereas the end 106c of the cathode terminal 106 serves as a connecting portion (mount portion) for connection with an electrode on the mount surface of the printed board by e.g. soldering. The intermediate portion 106b of the cathode terminal 106 serves as a lead portion for guiding the cathode 104 of the capacitor element 101 to the mount portion 106c on the lower surface 107c of the resin package 107.

The lead portion 106b of the cathode terminal 106 is bent to be inclined at a region within the resin package 107. This is because, in forming the anode terminal 105 and the cathode terminal 106 using a lead frame, the position of the connecting portion 105a of the anode terminal 105 for connection with the anode wire 103 and the position of the connecting portion 106a of the cathode terminal 106 for connection with the cathode 104 are deviated from each other correspondingly to the height difference between the anode wire 103 and the cathode 104 of the capacitor element 101.

Each of the anode terminals 105 and the cathode terminal 106 is bent at the position exiting the resin package 107 to extend downward along the side surface 107a, 107b of the resin package 107 and bent at the lower end of the side surface toward the lower surface 107c. The end 105c of the anode terminal 105 and the end 106c of the cathode terminal 106, which extend along the lower surface 107c of the resin package 107, serve as mount portions.

Patent Document 1: JP-A-2003-163137

In the surface-mount solid electrolytic capacitor 100, the capacitor element 101, which functions as a capacitor, is enclosed in the resin package 107, and the lead portions 103b 105b, 106b of the anode wire 103, the anode terminal 105 and the cathode terminal 106 are required for connecting the anode 103a and the cathode 104 of the capacitor element 101 to the mount portions 105c and 106c on the lower surface 107c of the resin package 107. Therefore, the lead portions 103b 105b, 106b of the anode wire 103, the anode terminal 105 and the cathode terminal 106 remain as the equivalent series inductance, which restricts the reduction of ESL.

FIG. 20 shows the equivalent circuit of the surface-mount solid electrolytic capacitor shown in FIG. 19. The equivalent circuit of the solid electrolytic capacitor 100 is represented as a series circuit of the capacitance C of the capacitor element 101, the equivalent series resistance Rx1 and equivalent series inductance Lx1 of the lead portion from the anode 103a of the capacitor element 101 to the mount portion 105c, and the equivalent series resistance Rx2 and equivalent series inductance Lx2 of the lead portion from the cathode 104 of the capacitor element 101 to the mount portion 106c.

When Rx represents the composite of the equivalent series resistance Rx1 and the equivalent series resistance Rx2 whereas Lx represents the composite of the equivalent series inductance Lx1 and the equivalent series inductance Lx2, the equivalent circuit of the solid electrolytic capacitor 100 is a series resonant circuit of the capacitor C, the series resistance Rx and the equivalent series inductance Lx. When the resonant frequency of this series resonant circuit is f0, in a frequency region higher than the resonant frequency f0, the inductance component is dominant and the series resonant circuit has characteristics that the impedance increases, as is well known.

Therefore, when the resonant frequency f0 is increased by reducing the equivalent series inductance Lx as much as possible, the frequency region in which the solid electrolytic capacitor 100 is to be used as a decoupling element can be made high. However, as noted before, the surface-mount solid electrolytic capacitor 100 requires lead portions for connecting the anode 103a and the cathode 104 of the capacitor element 101, which are enclosed in the resin package 107, to the anode mount portion 105c and the cathode mount portion 106c formed on the lower surface 107c of the resin package 107. Therefore, the equivalent series inductance Lx1, Lx2 corresponding to the length of the lead portions exist, so that there is a limitation on the increase of the resonant frequency f0.

The size reduction of a surface-mount solid electrolytic capacitor has been realized to some degree. For instance, the surface-mount solid electrolytic capacitor shown in FIG. 19 may have a length in the lateral direction of about 2 to 3 mm and a height of about 1 to 2 mm. However, in the solid electrolytic capacitor shown in FIG. 19, the anode terminal 105 and the cathode terminal 106 are guided to the substantial center of the side surfaces 107a and 107b of the resin package 107 and bent downward along the side surfaces 107a and 107b so that the end 105c and 106c are positioned on the lower surface 107c of the resin package 107. Therefore, for each of the anode 103a and the cathode 104 of the capacitor element 101, the line length of at least a little less than 1 mm is necessary to guide the anode or cathode to the lower surface 107c of the resin package 107.

It is possible that the resin package 107 of the solid electrolytic capacitor 100 is eliminated, and the prismatic capacitor element 101 is mounted directly on a printed board. However, this is impractical since the capacitor element 101 has a small prismatic shape whose sides are about 1 mm and the anode wire 103 has a small diameter of about 0.2 mm, whereby the mechanical and electrical stability may not be ensured in mounting the device on a printed board using a surface mounter.

DISCLOSURE OF THE INVENTION

The present invention is proposed under the above-described circumstances. It is, therefore, an object of the present invention to provide a solid electrolytic capacitor which is capable of reducing the ESL as much as possible, and a mount structure of the solid electrolytic capacitor to a printed board.

To achieve the object, the present invention takes the following technical measures.

According to a first aspect of the present invention, there is provided a solid electrolytic capacitor comprising a capacitor element including a sintered body of valve metal powder. The sintered body is provided with an anode and a cathode. A package encloses the capacitor element. A first lead member includes a first end connected to the anode, and extends straight from the anode. The first lead member includes a second end projecting from a side surface of the package. A second lead member includes a first end connected to the cathode and a second end extending straight and projecting from another side surface of the package. The first lead member and the second lead member extend generally horizontally at the substantially same height from the lower end of the package. The second end of the first lead member, which projects from the package, provides an anode terminal for external connection, whereas the second end of the second lead member, which projects from the package, provides a cathode terminal for external connection.

Preferably, the first lead member and the second lead member may be arranged on a substantially straight line, and the anode terminal and the cathode terminal may respectively project from opposite side surfaces of the package.

Preferably, the anode of the capacitor element may comprise a plurality of conductive wires partially embedded in the sintered body through a side surface thereof, whereas the cathode of the capacitor element may comprise a metal layer formed on a side surface of the sintered body other than the side surface.

According to a second aspect of the present invention, there is provided a solid electrolytic capacitor comprising a capacitor element including a sintered body of valve metal powder. An anode comprises a conductive wire penetrating through the sintered body, and a cathode comprises a metal layer formed on a surface of the sintered body other than a surface at which the conductive wire is exposed. A package encloses the capacitor element. A first lead member includes a first end connected to a first end of the conductive wire, extending straight from the conductive wire and including a second end projecting from a side surface of the package. A second lead member includes a first end connected to a second end of the conductive wire, extending straight from the conductive wire and including a second end projecting from a side surface of the package. A third lead member includes a first end connected to the cathode and a second end extending straight and projecting from a side surface of the package. The first lead member, the second lead member and the third lead member extend generally horizontally at the substantially same height from the lower end of the package. The second end of the first lead member, which projects from the package, provides a first anode terminal for external connection, the second end of the second lead member, which projects from the package, provides a second anode terminal for external connection, and the second end of the third lead member, which projects from the package, provides a cathode terminal for external connection.

Preferably, the first lead member and the second lead member may be arranged on a substantially straight line. The first anode terminal and the second anode terminal may respectively project from opposite side surfaces of the package. The third lead member may be arranged generally perpendicularly to the first lead member and the second lead member. The cathode terminal may project from a side surface of the package which is different from the side surfaces from which the first and the second anode terminals project.

Preferably, the conductive wire may be bent into a U-shape within the sintered body and include opposite ends exposed at the same side surface of the package and connected to the first lead member and the second lead member, respectively.

According to a third aspect of the present invention, there is provided a mount structure of a solid electrolytic capacitor as set forth in any of claims 1 through 6 to a board. In this mount structure, the board is formed with a hole or a recess which is larger than the outer configuration of the package. The board includes a surface formed with wiring electrodes at positions which are adjacent to the hole or the recess and which respectively face the anode terminal and the cathode terminal when the package is fitted in the hole or the recess. The package of the solid electrolytic capacitor is partially fitted in the hole or the recess. The anode terminal and the cathode terminal are connected to the corresponding wiring electrodes.

According to a fourth aspect of the present invention, there is provided a mount structure of a solid electrolytic capacitor as set forth in any of claims 1 through 6 to a board. In this mount structure, the board comprises a multi-layer board having a thickness larger than the thickness of the package of the solid electrolytic capacitor and including an upper layer and a lower layer. The board is formed with a hole which is larger, on the upper layer side, than the outer configuration of the solid electrolytic capacitor including the anode terminal and the cathode terminal and slightly larger, on the lower layer side, than the outer configuration of the package. The lower layer includes a surface exposed by the hole and formed with wiring electrodes at positions which respectively face the anode terminal and the cathode terminal when the package is fitted in the hole. The package of the solid electrolytic capacitor is entirely fitted in the hole, and the anode terminal and the cathode terminal are connected to the corresponding wiring electrodes on the surface of the lower layer.

Preferably, an insulating member may be loaded in the hole of the board to protect the solid electrolytic capacitor fitted in the hole.

Other features and advantages of the present invention will become more apparent from the detailed description given below with reference to the accompanying drawings.

BEST MODE FOR CARRYING OUT THE INVENTION

Preferred embodiments of the present invention will be described below with reference to the accompanying drawings.

Figure 1:
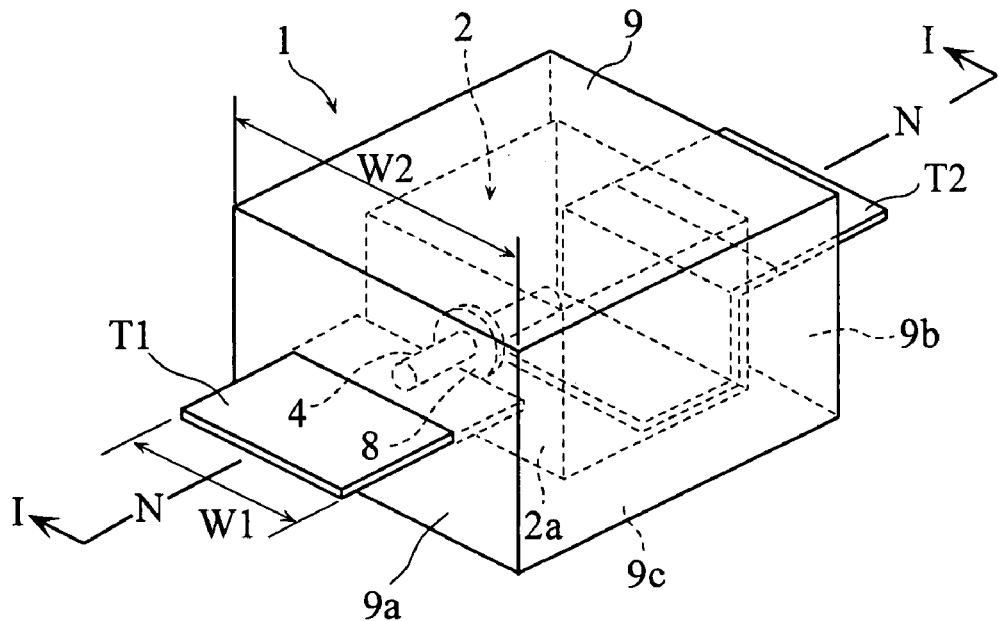
FIG. 1 is a perspective view showing a solid electrolytic capacitor according to a first embodiment of the present invention.
Figure 2:
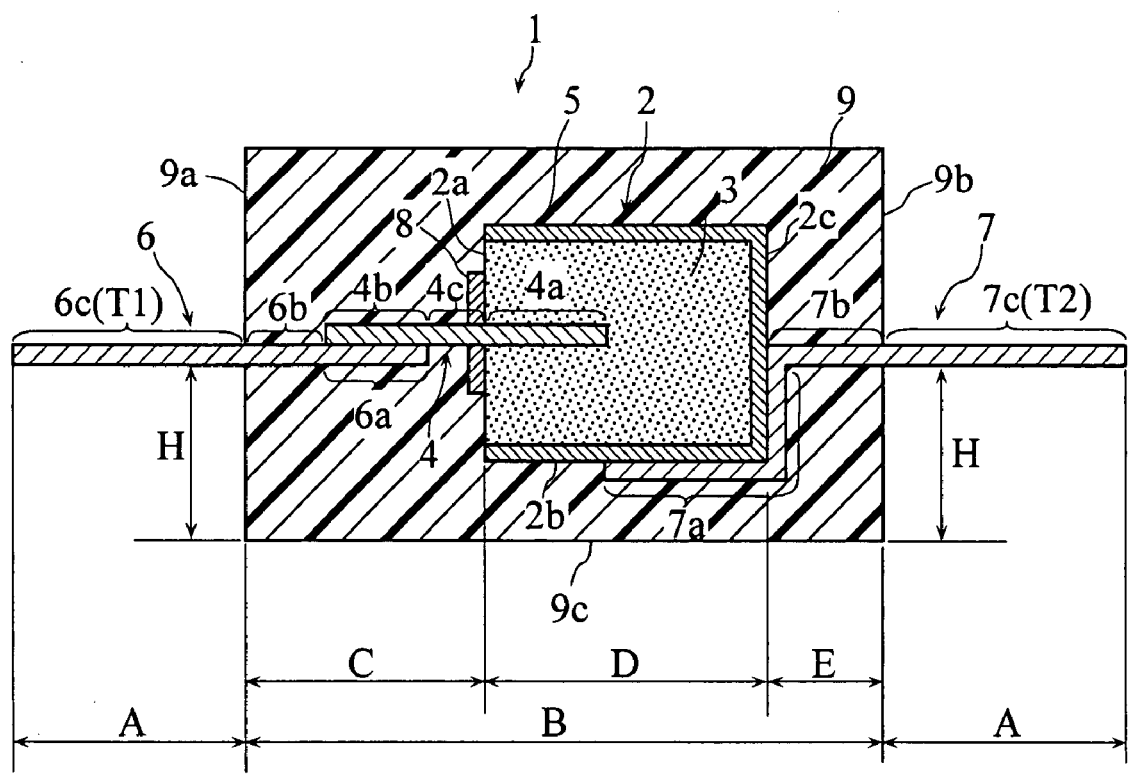
FIG. 2 is a sectional view taken along lines I-I in FIG. 1.

FIG. 1 is a perspective view showing a solid electrolytic capacitor according to a first embodiment of the present invention, whereas FIG. 2 is a sectional view taken along lines I-I in FIG. 1.

The solid electrolytic capacitor 1 includes a prismatic capacitor element 2 enclosed in a resin package 9, which is made of e.g. epoxy resin and in the form of a rectangular parallelepiped. The resin package 9 includes a first side surface 9a standing upright in the thickness direction of the package and a second side surface 9b opposite to the first side surface 9a. The solid electrolytic capacitor 1 includes an anode terminal T1 and a cathode terminal T2 both projecting at central portions of the respective side surfaces 9a, 9b and extending perpendicularly to these side surfaces for connection to a wiring electrode (see the electrodes 12 and 13 in FIG. 4) formed on a mount surface of a printed board (where the mount surface may be an obverse surface of a single-layer printed board, for example).

The capacitor element 2 comprises a prismatic porous sintered body 3 made of valve metal, an anode wire 4 of about 0.2 mm in diameter made of metal and partially embedded in the porous sintered body 3 at the substantially center portion of an end surface 2a of the sintered body, and a metal layer 5 serving as a cathode (hereinafter referred to as a cathode 5 when necessary) and formed on surfaces of the porous sintered body other than the side surface 2a. The region between the cathode 5 and the portion 4a of the anode wire 4 embedded in the porous sintered body 3 functions as a capacitor. The anode wire 4 may be a metal wire of tantalum or niobium, for example.

To make the capacitor element 2, powder of valve metal such as tantalum (Ta), aluminum (Al) or niobium (Nb) is compacted into the form of a prism and sintered, with an anode wire 4 partially embedded at the substantial center of the end surface 2a (production of a porous sintered body 3). Then, with a ring 8 made of Teflon (registered trademark)

attached to a root portion of the anode wire 4, an oxide film of Ta$_2$O$_5$ is formed on a surface of the porous sintered body 3 by e.g. anodic oxidation. Then, a manganese dioxide (MnO$_2$) layer, a graphite layer and a metal layer 5 are formed on the oxide film, whereby the capacitor element is obtained. The portion 4a of the anode wire 4, which is embedded in the porous sintered body 3, serves as the anode of the capacitor (hereinafter, this portion is referred to as "anode 4a"), whereas the metal layer 5 formed on the outer surface of the porous sintered body 3 serves as the cathode of the capacitor. It is to be noted that the ring 8 prevents short-circuiting between the anode wire 4 and the metal layer 5 in manufacturing the capacitor element 2.

As the material of the porous sintered body 3, any one of the above-described valve metals may be used. However, it is preferable to use niobium, which is more flame retardant than tantalum. The shape of the porous sintered body 3 is not limited to the prism mentioned above. For instance, the porous sintered body may be generally columnar or in the form of a short rectangular block.

A first lead member 6, which is made of a metal plate and serves to connect the anode 4a of the capacitor element 2 to the anode terminal T1, is connected to the end 4b of the anode wire 4 which projects from the porous sintered body 3. Specifically, with the end 4b of the anode wire 4 aligned with the center line N in the longitudinal direction, the base end 6a of the first lead member 6 is connected to the end 4b of the anode wire 4 by e.g. resistance welding. The portion of the first lead member 6 which is on the outer side of the base end 6a extends straight (horizontally in FIG. 2), and the end 6c projects from the side surface 9a of the resin package 9 to serve as the anode terminal T1. That is, the first lead member 6 is made up of two integral parts, i.e., the anode terminal T1 and a lead connecting the anode wire 4 of the capacitor element 2 to the anode terminal T1.

A second lead member 7, which is made of a metal plate and serves to connect the cathode 5 (entirety of the metal layer 5) to the cathode terminal T2, is connected to the metal layer 5 of the capacitor element 2. Specifically, the base end 7a of the second lead member 7 is bent into an L-shape. With the center line N in the longitudinal direction of the second lead member 7 aligned with the axis of the anode wire 4, the bent portion is fitted on two side surfaces 2b and 2c of the capacitor element 2. In this state, the second lead member 7 is bonded to the metal layer 5 of the capacitor element 2 via a conductive adhesive, for example. The portion of the second lead member 7 which is on the outer side of the base end 7a extends straight (horizontally in FIG. 2), and the end 7c projects from the side surface 9b of the resin package 9 to serve as the cathode terminal T2. That is, the second lead member 7 is made up of two integral parts, i.e., the cathode terminal T2 and a lead connecting the anode 5 of the capacitor element 2 to the cathode terminal T2.

The first lead member 6 and the second lead member 7 may be made by using a known lead frame including the lead members 6 and 7 in the connected state, which may prepared by punching a plate made of e.g. 42-alloy or copper alloy containing not less than 90% of copper and having a thickness of about 1 mm.

In the above-described structure, as shown in FIGS. 1 and 2, the end 6c of the first lead member 6 and the end 7c of the second lead member 7 project from respective substantial centers of opposite side surfaces 9a and 9b of the resin package 9, and more specifically, from the position of the same height H from the lower surface 9c of the resin package 9, whereby paired anode terminal T1 and cathode terminal T2 are provided.

Figure 19:
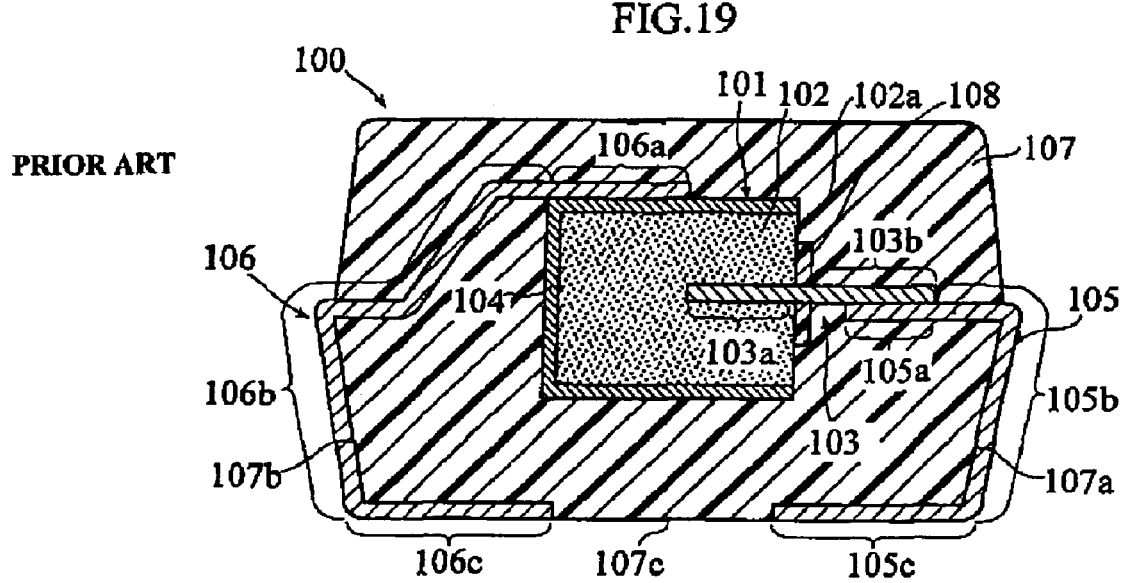
FIG. 19 is a sectional view showing an example of conventional surface-mount solid electrolytic capacitor.

The respective sizes of the resin package 9, anode terminal T1 and cathode terminal T2 of the solid electrolytic capacitor 1 shown in FIGS. 1 and 2 are substantially the same as those of the resin package 107 and mount portions 105c, 106c of the conventional solid electrolytic capacitor 100 shown in FIG. 19.

Specifically, the dimension B of the resin package 9 in the longitudinal direction is about 2 mm, whereas the dimension A of each of the anode terminal T1 and the cathode terminal T2 in the longitudinal direction is about 0.8 mm. The dimension D of the capacitor element 2 in the axial direction of the anode wire 4 is about 0.7 mm, the dimension C from the end surface 2a of the capacitor element 2 to the side surface 9a of the resin package 9 is about 0.8 mm, and the dimension E from the end surface 2c of the capacitor element 2 to the side surface 9b of the resin package 9 is about 0.4 mm. Since the height of the resin package 9 is about 2 mm, the height H of the anode terminal T1 and the cathode terminal T2 from the lower surface 9c of the resin package 9 is about 1 mm.

The width W1 of the anode terminal T1 and cathode terminal T1 is set to satisfy W1/W2=0.5 to 0.9 (more preferably, 0.6 to 0.9), where W2 is the width of the resin package 9 (see FIG. 1). In this embodiment, the width W2 of the resin package 9 is about 1 to 2 mm. Therefore, when W2=1.5 mm, the width W1 of the anode terminal T1 and cathode terminal T2 is about 0.75 to 1.35 mm. In this way, the width of the anode terminal T1 and the cathode terminal T2 is made relatively large to make the ESL as low as possible and stabilize the connection with the wiring electrodes formed on the printed board.

In the first embodiment, the section (lead section) between the anode 4a of the capacitor element 2 and the anode terminal T1 is connected generally linearly by the portion 6b of the first lead member 6 which is positioned in the resin package 9, the portion 4c of the anode wire 4 which projects from the end surface 2a of the porous sintered body 3, and the connection portions 4b, 6a of the anode wire 4 and the first lead member 6. The section (lead section) between the cathode 5 of the capacitor element 2 and the cathode terminal T2 is connected generally linearly by the portion 7b of the second lead member 7. Therefore, the lengths of the two lead portions are substantially equal to the dimension C and the dimension E, respectively.

In the conventional solid electrolytic capacitor 100 shown in FIG. 19, the length of the line (hereinafter referred to as "lead length") corresponding to the lead portion between the anode 4a of the capacitor 2 and the anode terminal T1 of the first embodiment is the total of the length of the lead portion 105b of the anode terminal 105 and the length of the lead portion 103b of the anode wire 103. Therefore, the lead length on the anode side of the capacitor element 2 according to the first embodiment is shorter than that of the conventional solid electrolytic capacitor 100 shown in FIG. 19 by at least as much as the length of the anode terminal 105 at the portion extending along the side surface 107a of the resin package 107.

Further, the portion 106b of the cathode terminal 106 in the conventional solid electrolytic capacitor 100 is the part corresponding to the lead portion of the first embodiment between the cathode 5 of the capacitor element 2 and the cathode terminal T2. Thus, the lead length on the cathode side of the capacitor element 2 according to the first embodiment is reduced in comparison with that of the conventional capacitor 100. This reduction results from the total effect of two factors. One is the elimination of the lead part extending on the side surface 107b of the resin package 107, and the other is the straightening of the bending part of the cathode terminal 106 in the resin package 107, so that the cathode terminal would be connected not to the metal layer 104 at the upper side of the sintered body 102, but to the center of the metal layer 104 on the opposite side of the side surface 102a of the sintered body 102 with the anode wire 103 embedded.

Figure 20:
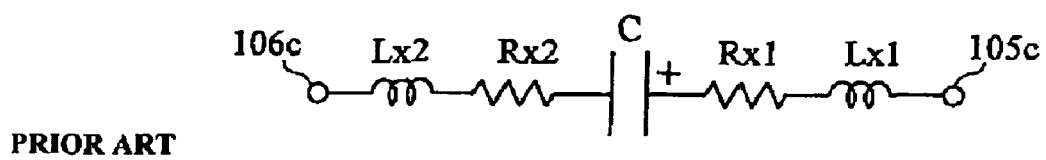
FIG. 20 shows an equivalent circuit of the surface-mount solid electrolytic capacitor shown in FIG. 19.

The equivalent circuit of the solid electrolytic capacitor 1 according to the first embodiment can be expressed similarly to that shown in FIG. 20. Therefore, in the solid electrolytic capacitor 1 of the first embodiment, both of the equivalent series inductance Lx1 determined based on the lead length C on the anode side and the equivalent series inductance Lx2 determined based on the lead length E on the cathode side are lower than those of the conventional solid electrolytic capacitor 100. Therefore, the ESL of the solid electrolytic capacitor 1 of the first embodiment is lower than that of the conventional solid electrolytic capacitor 100.

Therefore, the resonant frequency f0 of the solid electrolytic capacitor 1 according to the first embodiment is higher than the resonant frequency f0 of the conventional solid electrolytic capacitor 100. Therefore, when the solid electrolytic capacitor is used as a bypass capacitor or a decoupling element for removing noise from a power supply circuit, effective noise removal in a high frequency range is possible.

A method for mounting the solid electrolytic capacitor 1 of the first embodiment to a printed board will be described below.

As noted before, in the solid electrolytic capacitor 1 of the first embodiment, the anode terminal T1 and the cathode terminal T2 project from the respective substantial centers of the opposite side surfaces 9a and 9b of the resin package 9. Therefore, the method for mounting the solid electrolytic capacitor 1 to a printed board differs from the method for mounting the conventional solid electrolytic capacitor 100.

It is possible to mount the solid electrolytic capacitor 1 of the first embodiment to a printed board similarly to the surface-mount solid electrolytic capacitor 100. In this case, however, since the anode terminal T1 and the cathode terminal T2 are positioned at the height H (about 1 mm) from the surface of the printed board, a conductive member needs to be interposed between the anode terminal or the cathode terminal and the wiring electrode (hereinafter referred to as "patterned electrode") formed on the printed board correspondingly to each terminal. In this way, to mount the solid electrolytic capacitor 1 similarly to the surface-mount solid electrolytic capacitor 100, an additional member, i.e., the conductive member is necessary. The provision of a conductive member reduces the effect of reduction in ESL of the solid electrolytic capacitor 1. Thus, such a mounting method is inappropriate.

Figure 3:
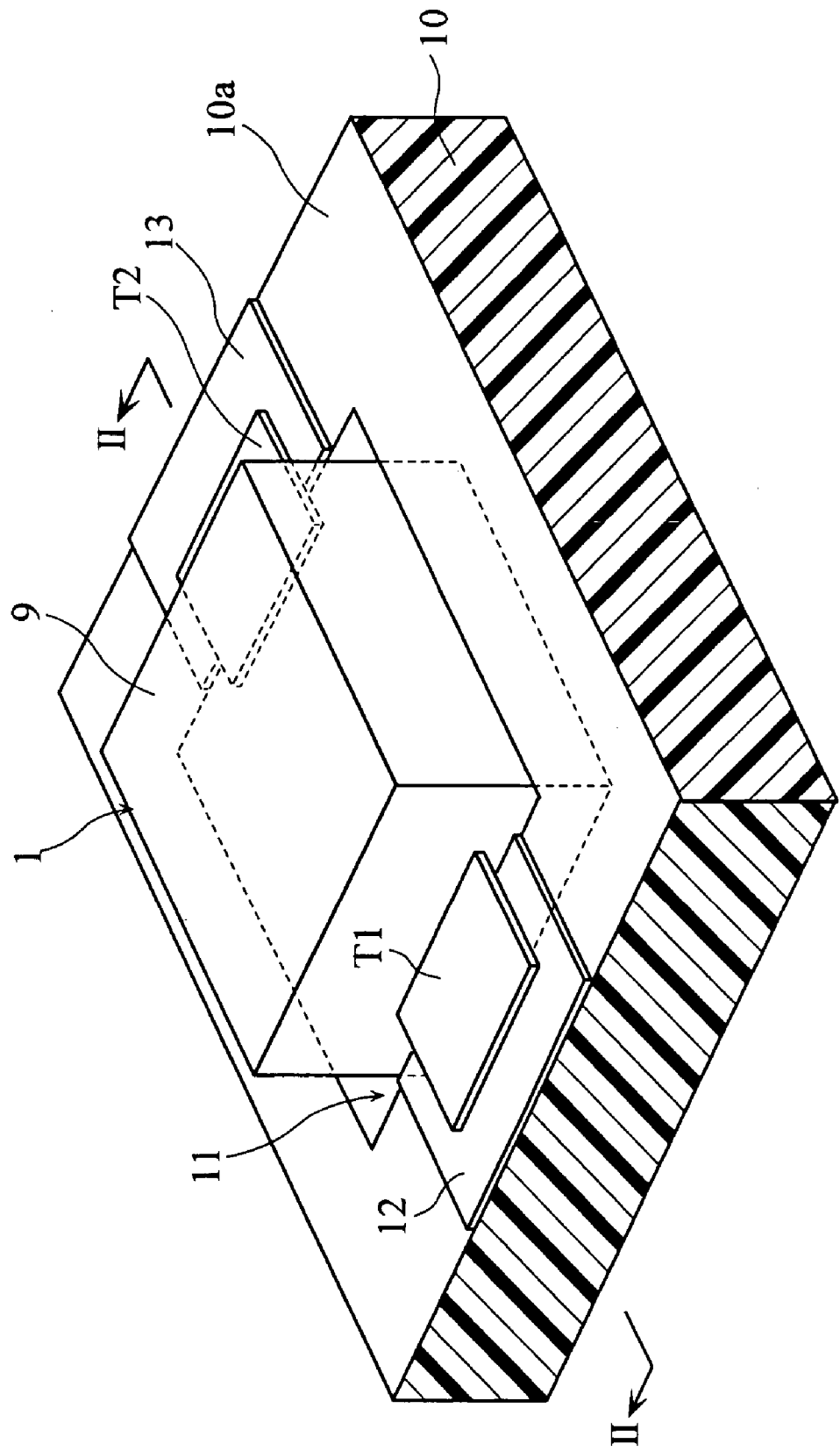
FIG. 3 is a perspective view showing an example of mount structure of the solid electrolytic capacitor according to the first embodiment to a printed board.
Figure 4:
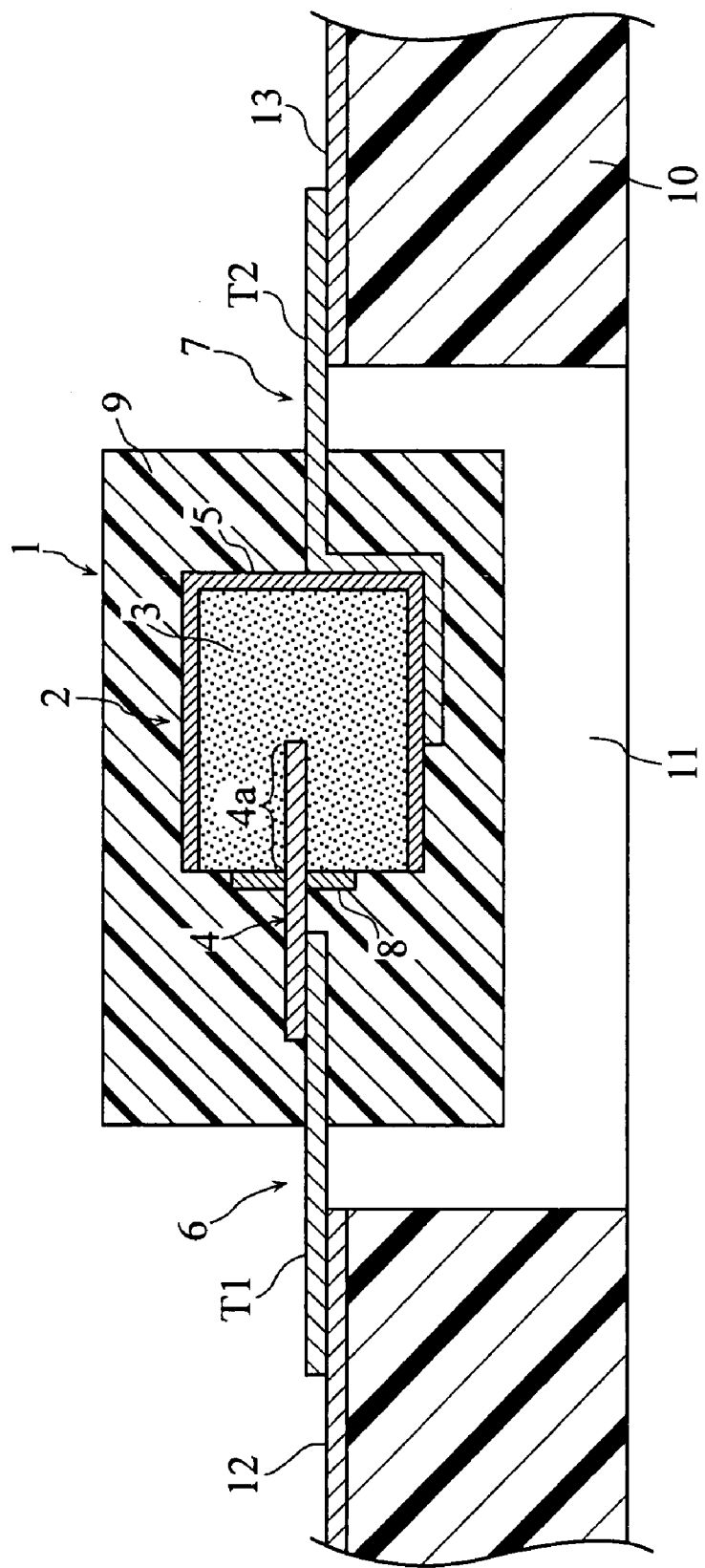
FIG. 4 is a sectional view taken along lines II-II in FIG. 3.

FIG. 3 is a perspective view showing an example of basic mount structure of the solid electrolytic capacitor shown in FIGS. 1 and 2 to a printed board. FIG. 4 is a sectional view taken along lines II-II in FIG. 3. As shown in FIGS. 3 and 4, to mount the solid electrolytic capacitor 1 of the first embodiment, a rectangular hole 11, which is slightly larger than the resin package 9 of the solid electrolytic capacitor 1 in plan view, is formed in a printed board 10. The portion of the resin package 9 which is lower than the anode terminal T1 and the cathode terminal T2 is inserted in the hole 11 so that the anode terminal T1 and the cathode terminal T2 are directly placed on the surface of the printed board 10. Thus, the capacitor is mounted to the printed board 10.

The printed board 10 is formed with a patterned electrode 12 made of a metal film of Au or Cu, for example, at a location on which the anode terminal T1 is to be placed. The printed board 10 is further formed with a patterned electrode 13 made of a metal film at a location on which the cathode terminal T2 is to be placed. The anode terminal T1 and the cathode terminal T2 are connected to the patterned electrode 12 and the patterned electrode 13, respectively, by e.g. soldering.

The patterned electrodes 12 and 13 shown in FIG. 3 comprise electrode pads having a rectangular shape slightly larger than the anode terminal T1 and the cathode terminal T2. However, the shape of the patterned electrodes 12 and 13 is appropriately selected depending on e.g. the wiring on the printed board 10, and the patterned electrodes are not limited to the rectangular electrode pads.

For instance, when the solid electrolytic capacitor 1 is to be arranged adjacent to a power supply terminal of an IC of a CPU for use as a decoupling element, the shape of the patterned electrode 12 for connecting the power supply terminal of an IC of the printed board 10 to the anode terminal T1 of the solid electrolytic capacitor 1 is made as short as possible and have as large an area as possible. Similarly, the patterned electrode 13 for connecting the ground of the printed board 10 and the cathode terminal T2 of the solid electrolytic capacitor 1 is made as short as possible and have as large an area as possible. With this arrangement, the inductance component of the line connecting the anode terminal T1 and the power supply terminal of the IC and the inductance component of the line connecting the cathode terminal T2 and the ground can be made as small as possible, and the ESL of the solid electrolytic capacitor 1 of this embodiment can be effectively reduced.

The hole 11 may be filled with epoxy resin, for example, so that the solid electrolytic capacitor 1 mounted to the printed board 10 is mechanically and electrically protected.

As shown in FIG. 4, according to the mount structure of the solid electrolytic capacitor 1 of the first embodiment to the printed board 10, the anode 4a and the cathode 5 of the capacitor element 2 can be connected to the patterned electrodes 12 and 13 formed on the printed board 10 while making the distance therebetween as small as possible. Therefore, even in use for a high frequency region, the inductance component between the solid electrolytic capacitor 1 and an electronic circuit such as an IC connected to the capacitor can be made as small as possible. Therefore, the ESL of the electronic circuit in which the solid electrolytic capacitor 1 is mounted to the printed board 10 can be reduced.

In the mount structure of the solid electrolytic capacitor 1 shown in FIGS. 3 and 4, instead of the hole 11, a rectangular recess may be formed on the mount surface 10a side of the printed board 10, and the resin package 9 of the solid electrolytic capacitor 1 may be accommodated in the recess.

In FIG. 4, the solid electrolytic capacitor 1 may be turned over so that the portion of the resin package 9 which is higher than the anode terminal T1 and the cathode terminal T2 is inserted in the hole 11. With this arrangement, the anode terminal T1 and the cathode terminal T2 are connected to the patterned electrode 12 and the patterned electrode 13, respectively. In this way, unlike the conventional surface-mount solid electrolytic capacitor 100, the orientation in mounting the solid electrolytic capacitor 1 is not determined, which facilitates the handling in the mounting process.

Figure 5:
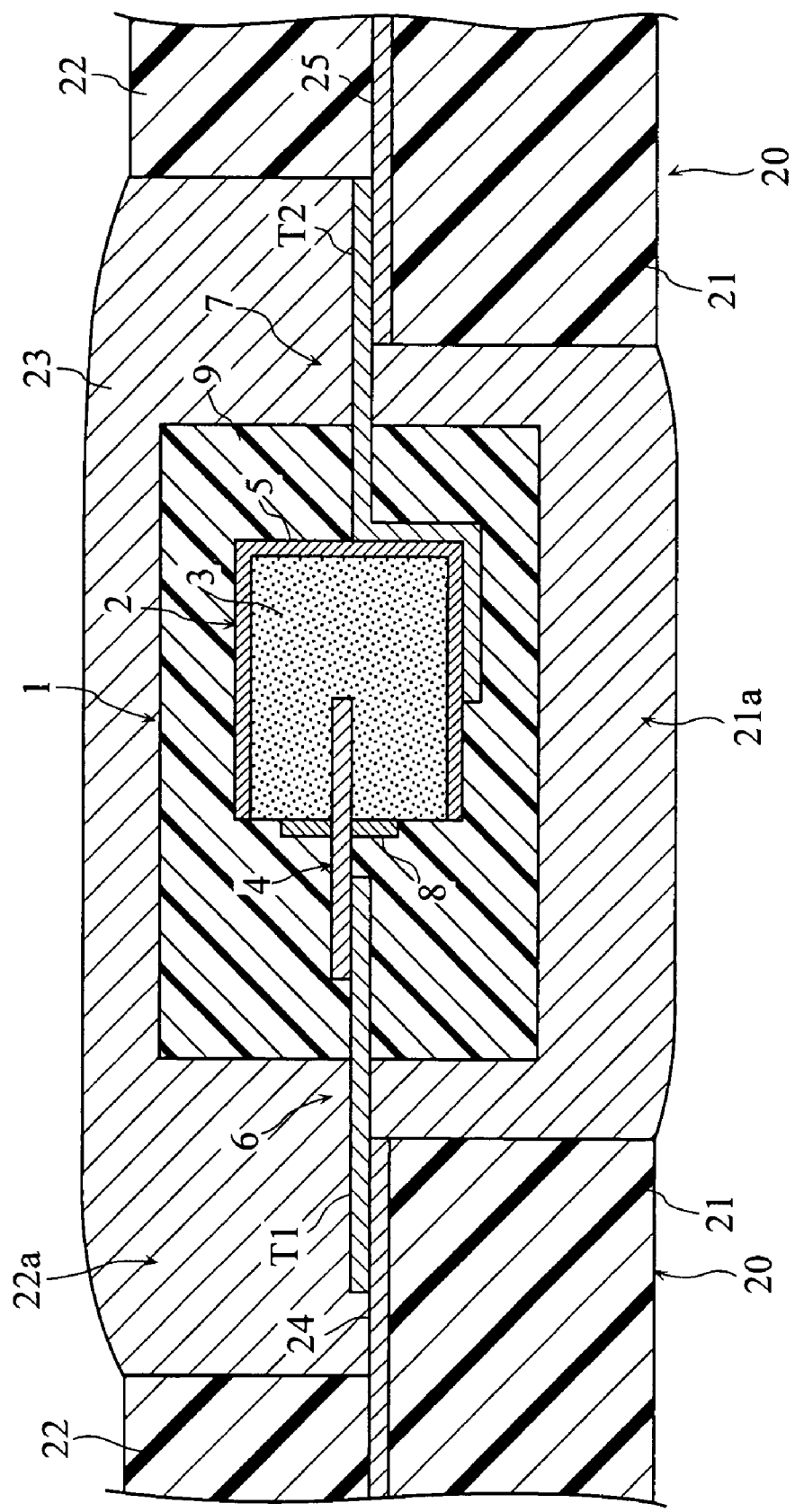
FIG. 5 is a sectional view showing a principal portion of another mount structure of the solid electrolytic capacitor according to the first embodiment to a printed board.

FIG. 5 is a sectional view showing a principal portion of another method of mounting the solid electrolytic capacitor 1 of the first embodiment.

In the mount structure shown in FIG. 5, the solid electrolytic capacitor 1 is mounted to an intermediate layer of a laminated board 20. The laminated board has a two-layer structure comprising a lower substrate 21 and an upper substrate 22. Patterned electrodes are formed on a surface of the upper substrate 22 and on a surface of the lower substrate 21 (i.e., as the laminated board 20, the region between the lower substrate 21 and the upper substrate 22, which will be hereinafter referred to as "intermediate layer"). The patterned electrode formed at the upper substrate 22 and that formed at the intermediate layer are electrically connected to each other by e.g. a non-illustrated through-hole or via hole.

In the mount structure shown in FIG. 5, a rectangular hole 21a, which is similar to the above-described hole 11, is formed in the lower substrate 21, whereas a hole 22a, which is larger than the hole 21a, is formed on in the upper substrate 22. The hole 22a is slightly larger than the size of the solid electrolytic capacitor 1 including the anode terminal T1 and the cathode terminal T2 in plan view. A patterned electrode 24 and a patterned electrode 25 are formed on the lower substrate 21 at portions exposed by the hole 22a of the upper substrate 22.

To mount the solid electrolytic capacitor 1 to the laminated board 20, the portion of the resin package 9 which is lower than the anode terminal T1 and the cathode terminal T2 is inserted in the hole 21a of the lower substrate 21 through the hole 22a of the upper substrate 22, so that the anode terminal T1 and the cathode terminal T2 are placed on the patterned electrodes 24 and the patterned electrode 25, respectively. The anode terminal T1 and the cathode terminal T2 are connected to the patterned electrode 24 and the patterned electrode 25, respectively, by e.g. soldering. Then, resin 23 such as epoxy resin is loaded in the holes 21a and 22a, whereby the capacitor is mounted to the board.

The height of the solid electrolytic capacitor 1 is smaller than the thickness of the laminated board 20, so that the solid electrolytic capacitor 1 is entirely accommodated in the space defined by the holes 21a and 22a. Therefore, by filling the space with the resin 23, the solid electrolytic capacitor 1 mounted to the laminated board 20 is mechanically and electrically protected.

With this arrangement again, instead of the hole 21a, a rectangular recess may be formed at the lower substrate 21 of the laminated board 20. In the mount structure shown in FIG. 5 again, the solid electrolytic capacitor 1 may be turned over so that the portion of the resin package 9 which is higher than the anode terminal T1 and the cathode terminal T2 is inserted in the hole 21a. With this arrangement, the anode terminal T1 and the cathode terminal T2 are connected to the patterned electrode 24 and the patterned electrode 25, respectively.

With this arrangement, the solid electrolytic capacitor 1 can be mounted so as not to project from the outer surfaces of the laminated board. Therefore, the mount structure is not bulky. As a result, in e.g. an electronic apparatus to which this mount structure is applied, the space efficiency is enhanced.

In the foregoing embodiment, the second lead member 7 is so bent that the base end 7a and the lead portion 7b form a right angle therebetween. However, as shown in FIG. 6, the second lead member 7 may be so bent that the base end 7a and the lead portion 7b form an obtuse angle therebetween, and the space formed between the end surface 2c of the capacitor element 2 and the lead portion 7b may be filled with conductive adhesive 14.

Figure 6:
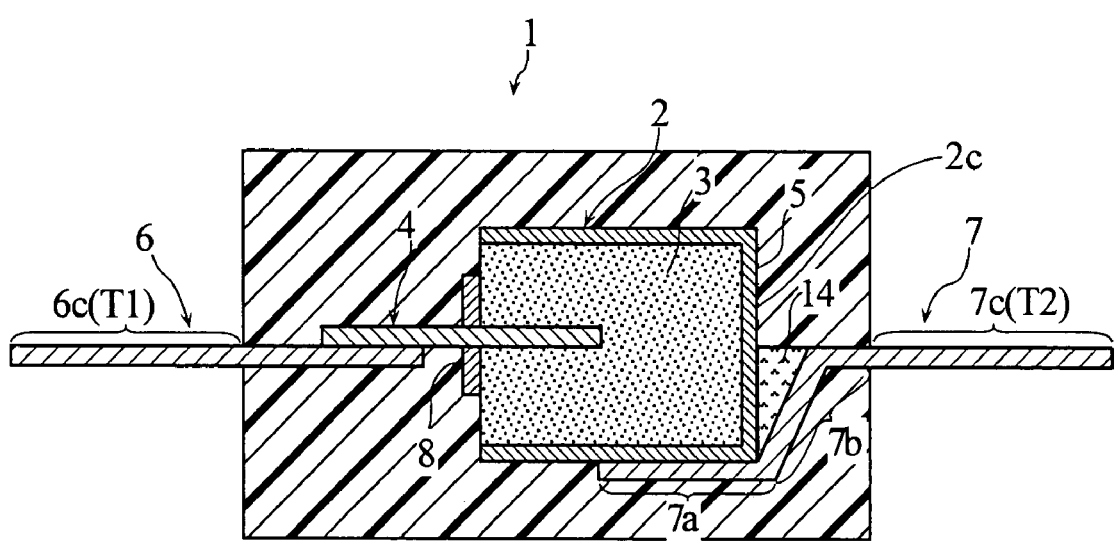
FIG. 6 is a sectional view showing a solid electrolytic capacitor using a variation of second lead member.

In the structure shown in FIG. 6, the second lead member 7 does not need to be bent at right angles but can be bent at an appropriate angle. Therefore, the bending work is easy. When the connection area between the base end 7a of the second lead member 7 and the cathode 5 of the capacitor element 2 is sufficient in terms of electrical properties, the space between the end surface 2c of the capacitor element 2 and the lead portion 7b may not be filled with conductive adhesive 14.

Figure 7:
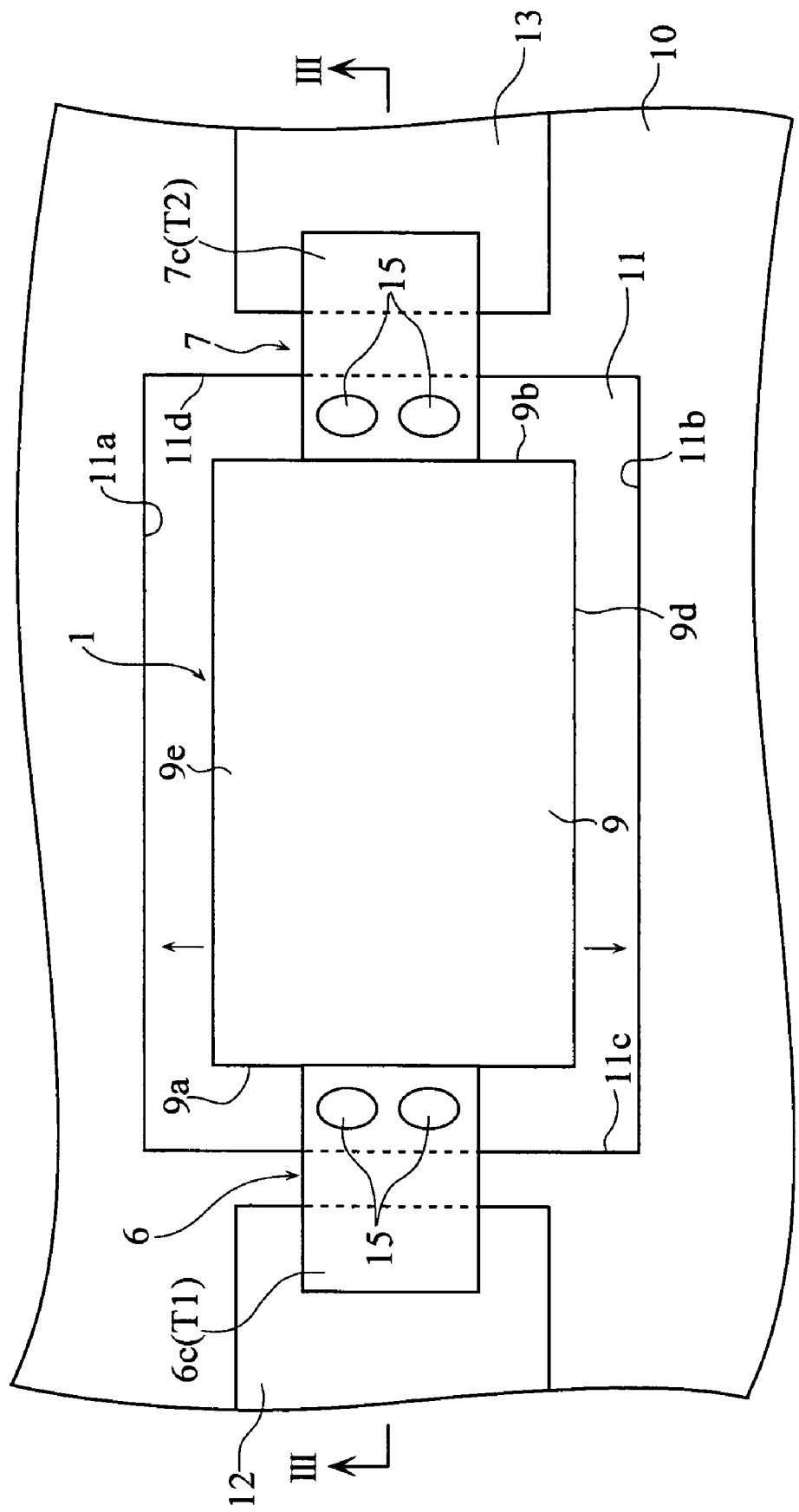
FIG. 7 is a plan view showing a mount structure of a solid electrolytic capacitor to a printed board, which utilizes a positioning projection provided at the anode terminal and the cathode terminal.
Figure 8:
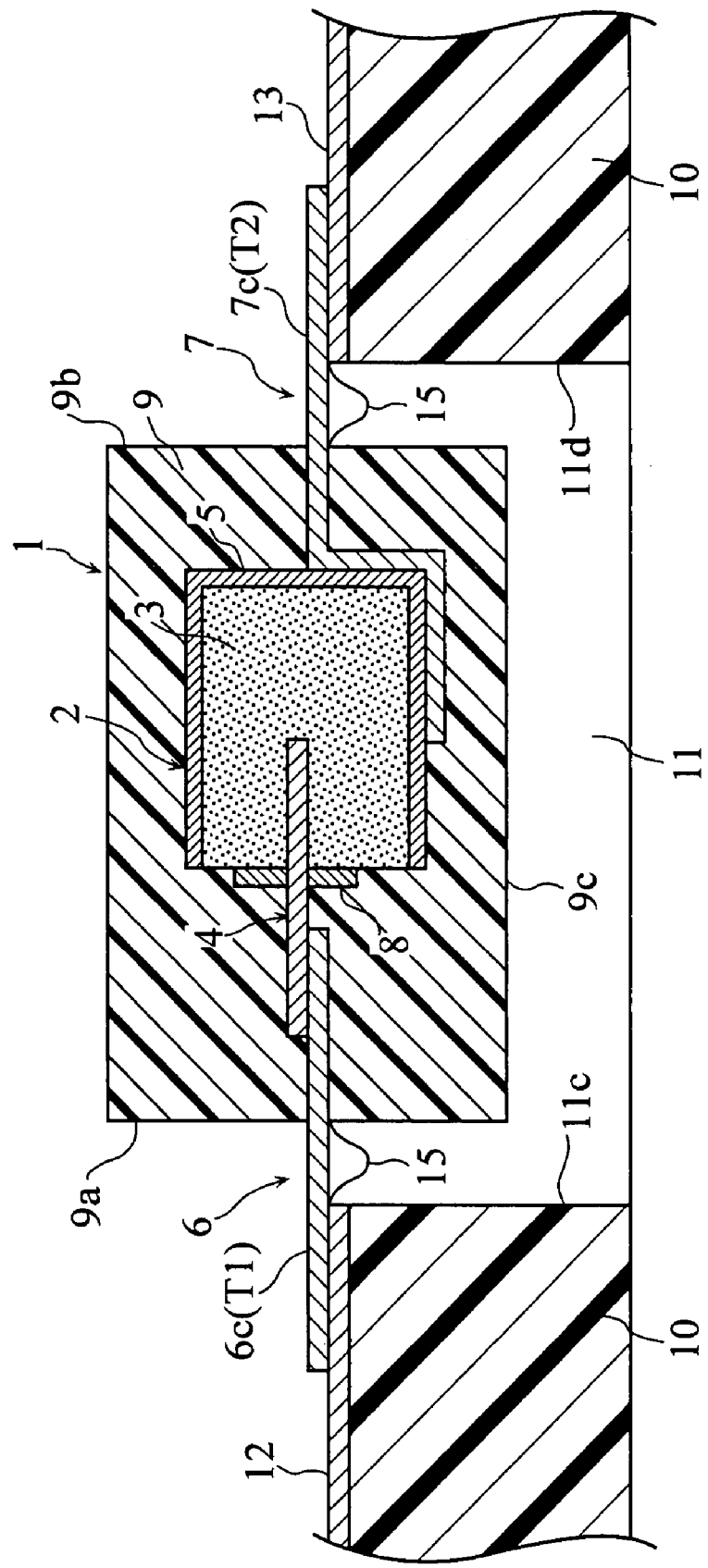
FIG. 8 is a sectional view taken along lines III-III in FIG. 7.

In the above-described embodiment, positioning of the solid electrolytic capacitor 1 with respect to the hole 11 of the printed board is not particularly performed. However, as shown in FIGS. 7 and 8, at least one projection 15 (two projections in FIG. 7) may be provided at the root portion (the portion adjacent to the resin package 9) of each of the anode terminal T1 and the cathode terminal T2. With this structure, in mounting the solid electrolytic capacitor 1, the position of the solid electrolytic capacitor 1 in the hole 11 in the longitudinal direction can be determined by bringing the projections 15 into contact with the inner surfaces 11c, 11d of the hole 11. Although the projections 15 are provided at both of the anode terminal T1 and the cathode terminal T2 in the example shown in FIGS. 7 and 8, the projection may be provided only at either one of the terminals.

Further, the position of the solid electrolytic capacitor 1 in the width direction may be determined by moving the solid electrolytic capacitor 1 as indicated by arrows in FIG. 7 to bring the side surface 9e of the resin package 9 into contact with the inner surface 11a of the hole 11 or bring the side surface 9d of the resin package 9 into contact with the inner side surface 11b of the hole 11.

Figure 9:
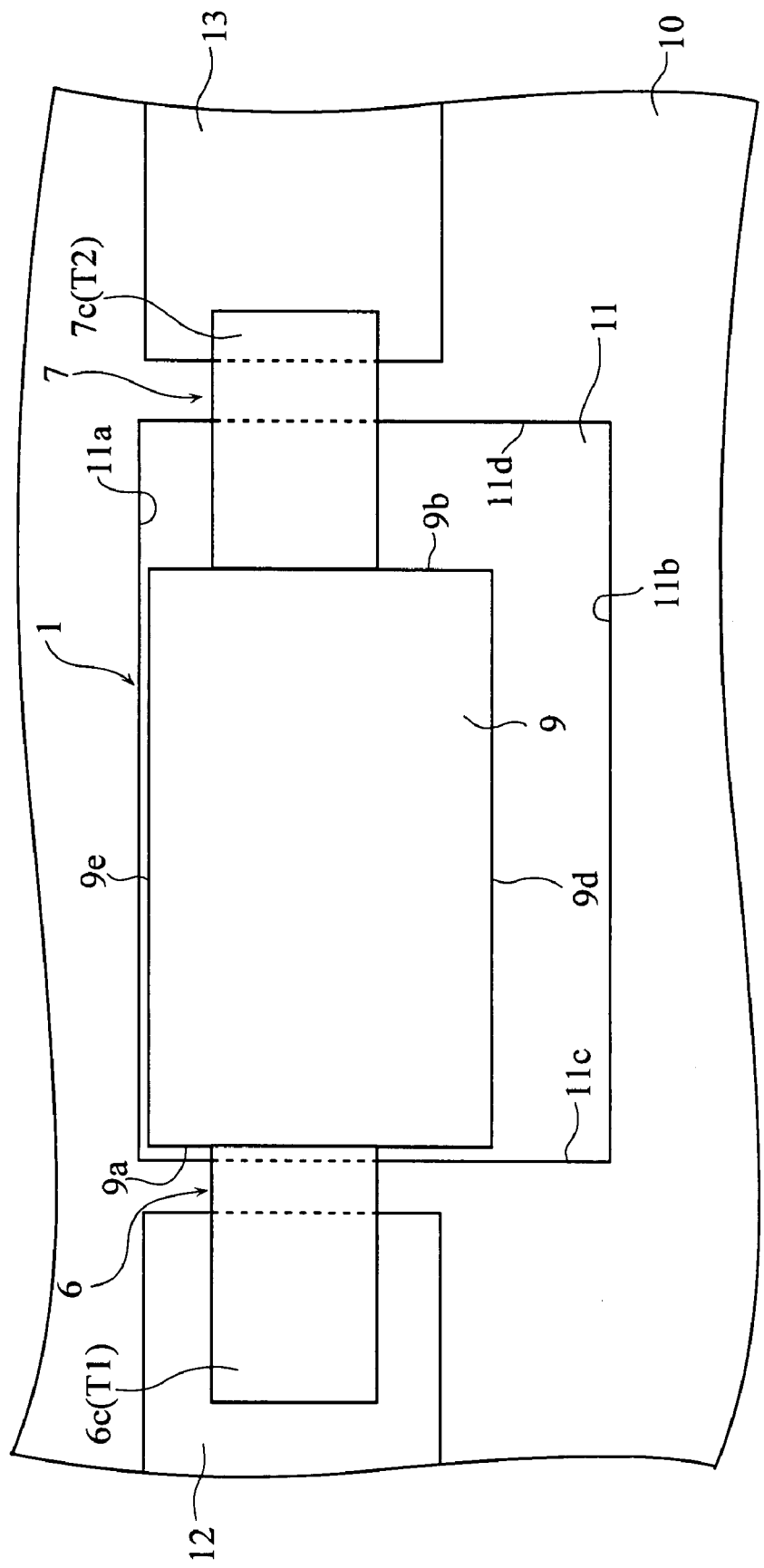
FIG. 9 is a plan view showing a positioning technique in mounting the solid electrolytic capacitor according to the first embodiment to a printed board.

Alternatively, as shown in FIG. 9, the projection 15 may not be provided at the anode and the cathode terminals T1 and T2, and the position of the solid electrolytic capacitor 1 in the hole 11 may be determined by bringing the longitudinal side surface 9e and the shorter side surface 9a of the resin package 9 into contact with the inner surface 11a and the inner surface 11c of the hole 11, respectively.

Although the resin package 9 is in the form of a rectangular parallelepiped in this embodiment, the resin package may have a shape including a curve such as a circular shape or an oval shape in plan view. In such a case again, the position of the solid electrolytic capacitor 1 in the hole 11 can be determined in a manner similar to the above.

Figure 10:
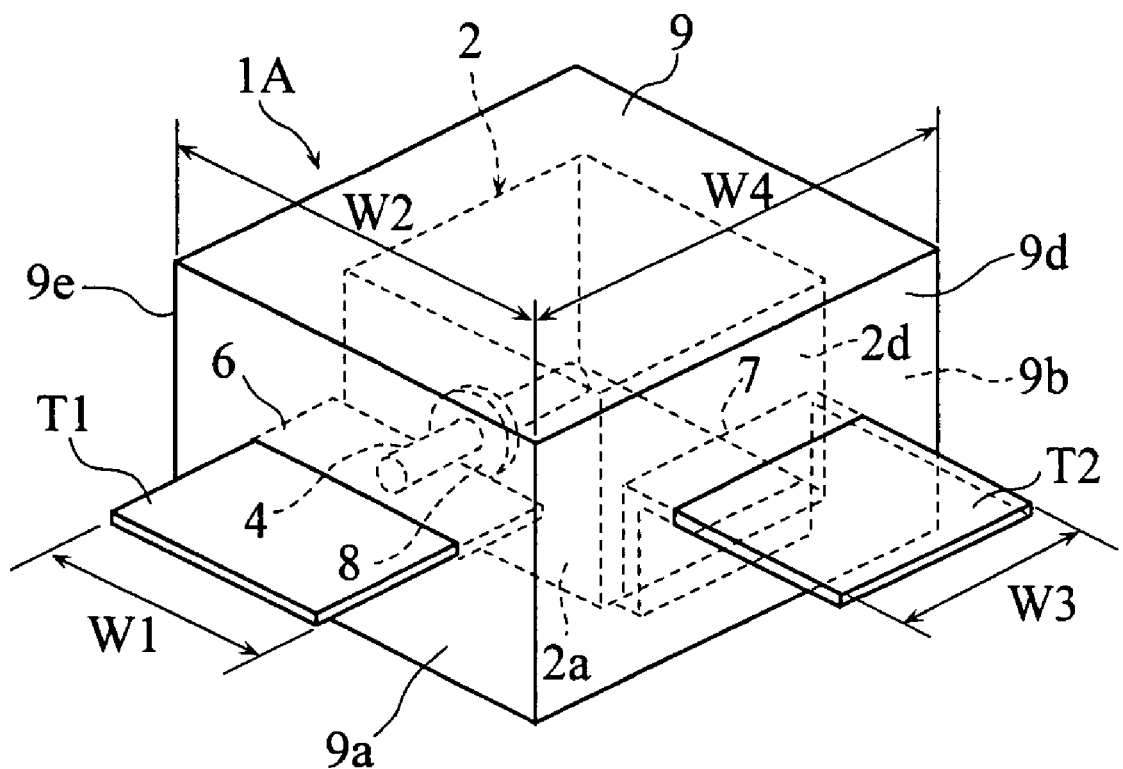
FIG. 10 is a perspective view showing a solid electrolytic capacitor according to a second embodiment of the present invention.

FIG. 10 is a perspective view showing a solid electrolytic capacitor according to a second embodiment of the present invention.

The solid electrolytic capacitor 1A of the second embodiment differs from the solid electrolytic capacitor 1 of the first embodiment in position of the cathode terminal T2. In the solid electrolytic capacitor of the first embodiment, the cathode terminal T2 is provided at the side surface 9b of the resin package 9 which is opposite from the side surface 9a at which the anode terminal T1 is provided, so that the anode terminal T1 and the cathode terminal T2 are aligned. In the solid electrolytic capacitor 1A of the second embodiment, however, the cathode terminal T2 is provided to project from a side surface 9d of the resin package 9, which adjoins the side surface 9a at which the anode terminal T1 is provided.

Specifically, in FIG. 1, the second lead member 7 is turned through 90 degrees clockwise with respect to the capacitor element 2. The bent portion of the second lead member 7 is fitted to the side surfaces 2b, 2d of the capacitor element 2, and the second lead member 7 and the metal layer 5 of the capacitor element 2 are bonded together via conductive adhesive. The portion of the second lead member 7 outside the base end 7a extends straight, and the end 7c projects from the side surface 9d of the resin package 9 to serve as the cathode terminal T2.

With this arrangement again, the width W3 of the cathode terminal T2 is set to satisfy W3/W4=0.5 to 0.9 (more preferably, 0.6 to 0.9), where W4 is the dimension of the resin package 9 in the longitudinal direction. In the second embodiment, the longitudinal dimension W4 of the resin package 9 is about 2 mm. Therefore, the width W3 of the cathode terminal T2 is about 1.0 to 1.8 mm.

The structure of other parts of the solid electrolytic capacitor 1A according to the second embodiment is the same as that of the solid electrolytic capacitor 1 according to the first embodiment. The solid electrolytic capacitor 1A of the second embodiment can be mounted to a printed board 10 or a laminated board 20 similarly to the solid electrolytic capacitor 1 of the first embodiment. Therefore, the solid electrolytic capacitor 1A of the second embodiment enjoys the same advantages as those of the solid electrolytic capacitor 1 of the first embodiment.

In FIG. 10, the cathode terminal T2 may be provided at the side surface 9e of the resin package 9 which is opposite from the side surface 9d.

Alternatively, as shown in FIG. 11(a), the cathode terminal T2 may be provided to project from the opposite side surfaces 9d and 9e of the resin package 9. In this case, two separate lead members 7 can be used. Preferably, however, use may be made of a second lead member 7A having a shape obtained by connecting the ends of two lead members 7 together.

Alternatively, as shown in FIG. 11(b), using a second lead member 7A, two cathode terminals T2 may be added to the side surfaces 9d and 9e of the resin package 9 of the solid electrolytic capacitor 1 according to the first embodiment.

Figure 11:
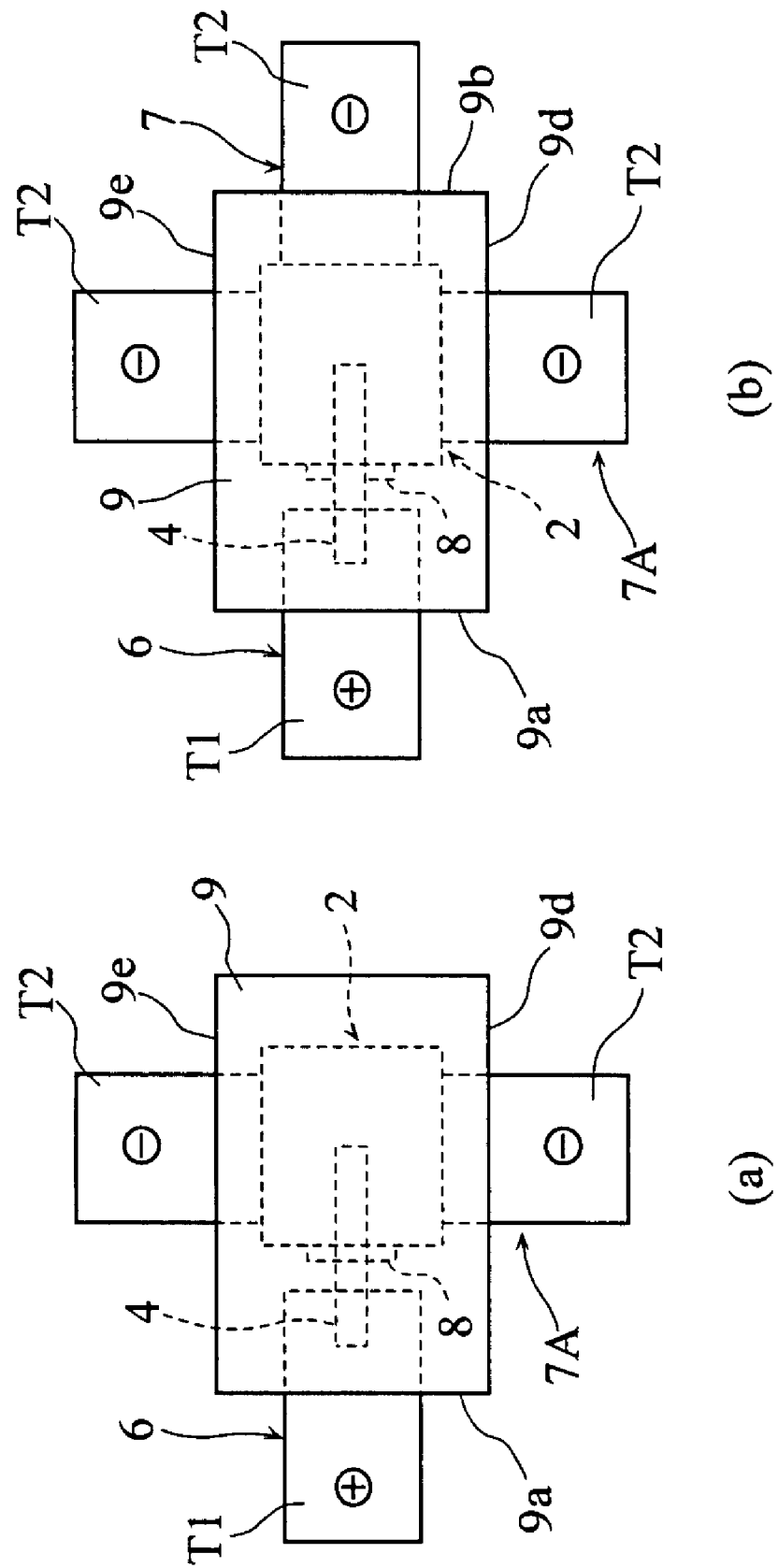
FIG. 11 shows a variation of the cathode terminal of the solid electrolytic capacitor according to the first and the second embodiments.

In the variations of cathode terminal T2 of the solid electrolytic capacitor 1A shown in FIG. 11, the number of cathode terminals T2 is increased, so that the line width of the lead portion from the cathode 5 of the capacitor element 2 to the cathode terminal T2 substantially increases. Therefore, in the equivalent circuit shown in FIG. 20, the equivalent series inductance Lx2 decreases. Therefore, the ESL of the solid electrolytic capacitor 1A is further reduced advantageously.

In the solid electrolytic capacitor 1A of the second embodiment again, the second lead member 7 may be bent to form an obtuse angle in such a manner as shown in FIG. 6. Further, the positioning technique described with reference to FIGS. 7-9 may be employed.

Figure 12:
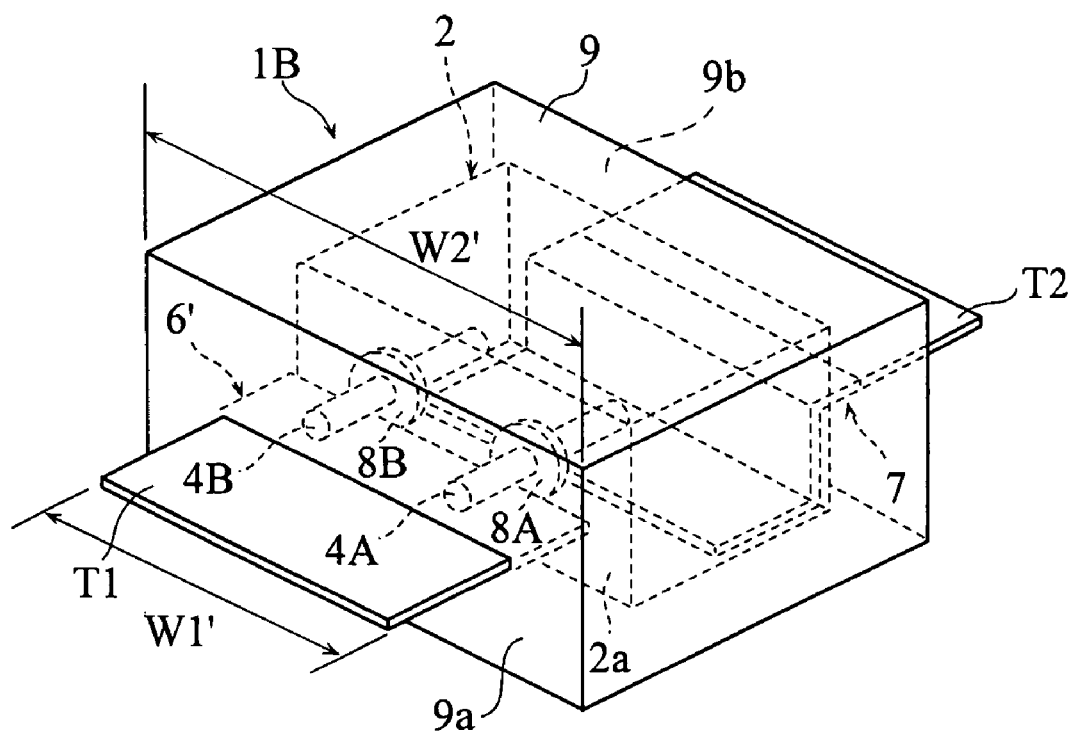
FIG. 12 is a perspective view showing a solid electrolytic capacitor according to a third embodiment of the present invention.

FIG. 12 is a perspective view showing a solid electrolytic capacitor according to a third embodiment of the present invention.

The solid electrolytic capacitor 1B of the third embodiment differs from the solid electrolytic capacitor 1 of the first embodiment in structure of anode wire 4 of the capacitor element. In the solid electrolytic capacitor 1 of the first embodiment, the single anode wire 4 is embedded at the substantial center of the end surface 2a of the capacitor element 2. Unlike this, in the solid electrolytic capacitor 1B of the third embodiment, two anode wires 4A and 4B are embedded at the end surface 2a of the capacitor element 2, and the portions of the two anode wires 4A and 4B which project from the porous sintered body 3 are connected to a first lead member 6'.

With this arrangement again, the width W1' of the anode terminal T1 and the cathode terminal T2 is set to satisfy W1'/W2'=0.5 to 0.9 (more preferably, 0.6 to 0.9), where W2' is the dimension of the resin package 9 in the width direction.

In the solid electrolytic capacitor 1B of the third embodiment, to arrange the two anode wires, the width of the end surface 2a of the capacitor element 2 is increased as compared with that of the solid electrolytic capacitor 1 of the first embodiment. Correspondingly to this, the width of the first lead member 6' and the second lead member 7 is also increased. Similarly to the solid electrolytic capacitor 1 of the first embodiment, the end of the first lead member 6' which projects from the side surface 9a of the resin package 9 and the end of the second lead member 7 which projects from the side surface 9b serve as the anode terminal T1 and the cathode terminal T2, respectively.

Figure 13:
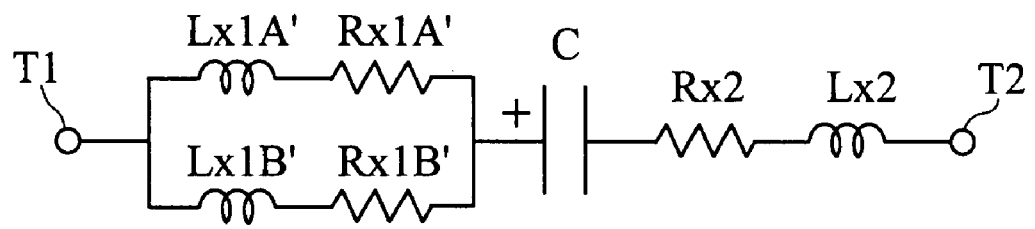
FIG. 13 shows an equivalent circuit of the solid electrolytic capacitor according to the third embodiment.

FIG. 13 shows the equivalent circuit of the solid electrolytic capacitor 1B of the third embodiment which includes two anode wires 4.

In the solid electrolytic capacitor 1B, the lead portion between the anode 4a of the capacitor element 2 and the anode terminal T1 is made up of the anode wire 4A and the anode wire 4B. Therefore, in the equivalent circuit of the lead portion between the anode 4a and the anode terminal T1, two series combination, i.e., a series combination of the equivalent series resistance Rx1A' and equivalent series inductance Lx1A' of the lead portion of the anode wire 4A and another series combination of the equivalent series resistance Rx1B' and equivalent series inductance Lx1B' of the lead portion of the anode wire 4B, are connected in parallel with each other.

In this instance, when the equivalent series inductance Lx1A' and the equivalent series inductance Lx1B' are substantially equal, with the equivalent series resistance Rx1A' and the equivalent series resistance Rx1B' ignored, the composite equivalent series inductance Lx is approximately Lx1A'/2 (or Lx1B'/2). This shows that the equivalent series inductance Lx of the solid electrolytic capacitor 1B according to the third embodiment is lower than that of the solid electrolytic capacitor 1 of the first embodiment, contributing to a low ESL.

The solid electrolytic capacitor 1B of the third embodiment can be mounted to a printed board 10 or a laminated board 20 similarly to the solid electrolytic capacitor 1 of the first embodiment. With the mounting method, therefore, the same advantages as those of the solid electrolytic capacitor 1 of the first embodiment can be enjoyed.

In the solid electrolytic capacitor 1B of the third embodiment again, a plurality of cathode terminals T2 may be provided in such a manner as shown in FIG. 11.

Further, in the solid electrolytic capacitor 1B of the third embodiment again, the second lead member 7 may be bent to form an obtuse angle in such a manner as shown in FIG. 6. Moreover, the positioning technique described with reference to FIGS. 7-9 may be employed.

Figure 14:
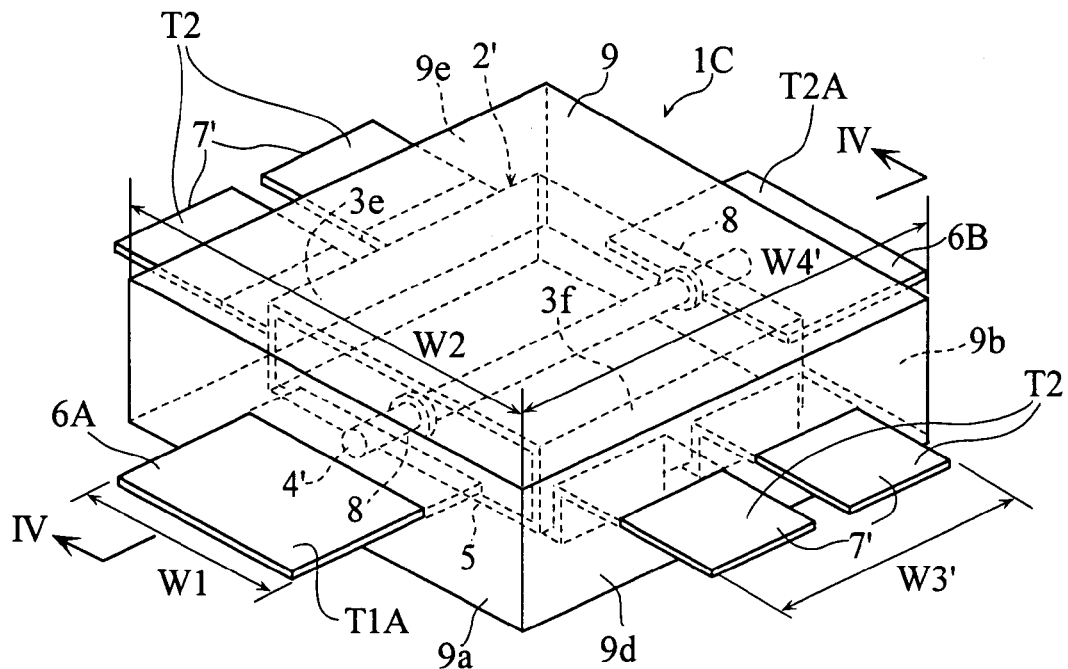
FIG. 14 is a perspective view showing a solid electrolytic capacitor according to a fourth embodiment of the present invention.
Figure 15:
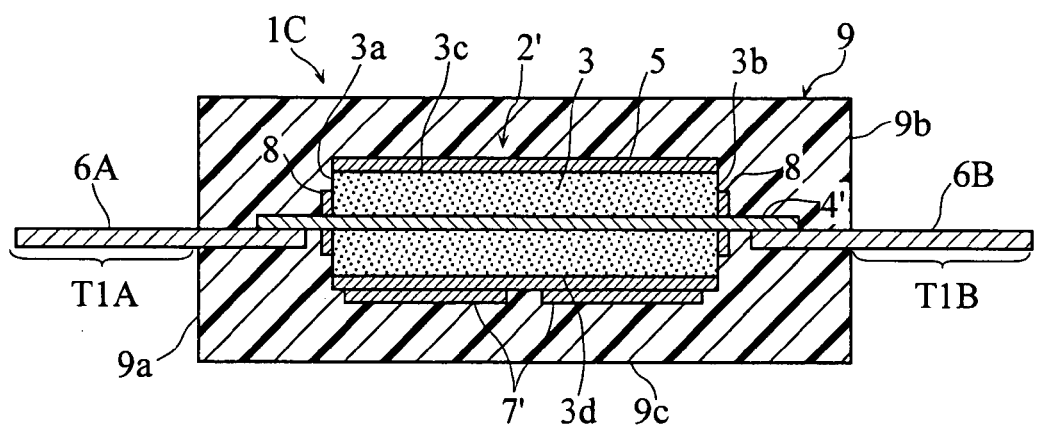
FIG. 15 is a sectional view taken along lines IV-IV in FIG. 14.

FIG. 14 is a perspective view showing a solid electrolytic capacitor according to a fourth embodiment of the present invention. FIG. 15 is a sectional view taken along lines IV-IV in FIG. 14.

While the solid electrolytic capacitors 1-1B of the first through the third embodiments have a two-terminal structure, the solid electrolytic capacitor 1C of the fourth embodiment has a three-terminal structure.

The solid electrolytic capacitor 1C of the fourth embodiment is similar to the solid electrolytic capacitors 1-1B of the first through the third embodiments in that the capacitor element 2' is enclosed in a resin package 9 made of epoxy resin and that the anode and the cathode terminals are provided to project from the side surfaces of the resin package 9.

The solid electrolytic capacitor 1C of the fourth embodiment differs from the solid electrolytic capacitors 1-1B of the first through the third embodiments in structure of the capacitor element 2' and that two anode terminals T1A, T1B are provided.

The capacitor element 2' includes a porous sintered body 3, which is in the form of a rectangular parallelepiped having a relatively small height, and an anode wire 4' penetrating the porous sintered body 3 through respective substantial centers of opposite side surfaces 3a and 3b of the porous sintered body 3. To the opposite ends of the anode wire 4' which project from the porous sintered body 3, a first lead member 6A and a second lead member 6B are connected respectively. The anode wire 4' is a metal wire of about 0.2 mm in diameter made of tantalum or niobium. The anode wire 4' is a signal line for transmitting signals, and the portion thereof positioned within the porous sintered body 3 serves as the anode of the capacitor element 2. To each of opposite ends of the anode wire 4' which project from the porous sintered body 3, a ring 8 made of Teflon (registered trademark) is attached. The capacitor element 2' may be made similarly to the capacitor element 2 of the solid electrolytic capacitor 1 of the first embodiment.

The first lead member 6A and the second lead member 6B have the same function as that of the first lead member 6 of the solid electrolytic capacitor 1 of the first embodiment, and extend straight from the connection portions of the anode wire 4' so that respective ends thereof project from the opposite side surfaces 9a and 9b of the resin package 9. The projecting portions serve as the anode terminals T1A and T1B.

A metal layer 5 is formed on surfaces of the porous sintered body 3 other than the side surfaces 3a and 3b (i.e., on the upper surface 3c, lower surface 3d and side surfaces 3e, 3f). The metal layer 5 serves as the cathode of the capacitor element 2'.

To the metal layer 5 on the lower surface 3d and the side surfaces 3e, 3f of the porous sintered body 3, two third lead members 7', each of which is bent to include a recess, are connected. The depth of the recessed portion of each third lead member 7' is substantially ½ of the height of the side surface 3e, 3f of the porous sintered body 3. The lower surface 3d and the side surfaces 3e, 3f of the porous sintered body 3 are fitted to the recesses of the third lead members 7', and the third lead members 7' and the metal layer 5 are connected to each other at the contact portions via a conductive adhesive. Although two separate third lead members 7' are provided in this embodiment, use may be made of a single lead member having the configuration obtained by integrally connecting the two lead members 7' together.

The third lead members 7' have the same function as that of the second lead member 7 of the solid electrolytic capacitor 1 according to the first embodiment. The opposite ends of each third lead member 7' extend perpendicularly to the side surfaces 3e and 3f and project from the side surfaces 9d and 9e of the resin package 9. The projecting portions serve as cathode terminals. The first lead member 6A, the second lead member 6B and the third lead members 7' may be made by using a known lead frame including the lead members 6A, 6B and 7' in the connected state, which may prepared by punching a plate made of 42-alloy or copper alloy containing not less than 90% of copper and having a thickness of about 1 mm.

As shown in FIG. 15, in the solid electrolytic capacitor 1C of the fourth embodiment again, similarly to the solid electrolytic capacitor 1 of the first embodiment, two anode terminals T1A and T1B are provided at the substantially same height from the lower surface 9c of the resin package 9 and project from the opposite side surfaces 9a and 9b. The cathode terminals T2 are provided at the substantially same height as the anode terminal T1A, T1B and project from the side surfaces 9d, 9e extending perpendicularly to the side surface 9a, 9b.

With this arrangement again, the width W1 of the anode terminals T1A, T1B is set to satisfy W1/W2=0.5 to 0.9 (more preferably, 0.6 to 0.9), where W2 is the width of the resin package 9. The width W3' of the cathode terminals T2 (total width of the two cathode terminals in FIG. 14) is set to satisfy W3'/W4'=0.5 to 0.9 (more preferably, 0.6 to 0.9), where W4' is the width of the resin package 9.

Figure 16:
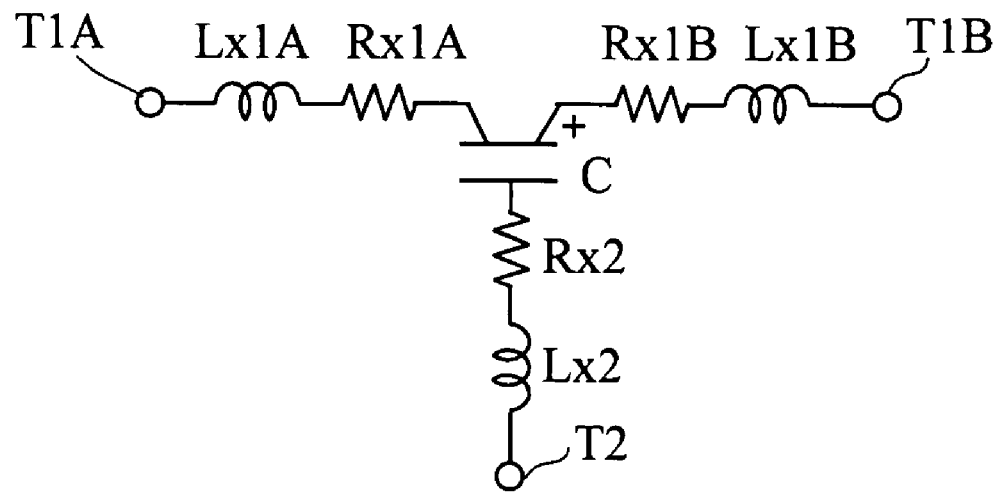
FIG. 16 shows an equivalent circuit of the solid electrolytic capacitor according to the fourth embodiment.

FIG. 16 shows the equivalent circuit of the solid electrolytic capacitor 1C according to the fourth embodiment.

In the figure, the capacitance C represents the capacitance between the anode (the portion of the anode wire 4' which is positioned within the porous sintered body 3) of the capacitor element 2' and the cathode (metal layer 5). The equivalent series resistance Rx1A and the equivalent series inductance Lx1A represent the equivalent series resistance and the equivalent series inductance of the anode wire 4' between the anode of the capacitor element 2' and the anode terminal T1A, and the lead portion of the first lead member 6A. The equivalent series resistance Rx1b and the equivalent series inductance Lx1B represent the equivalent series resistance and the equivalent series inductance of the anode wire 4' between the anode of the capacitor element 2' and the anode terminal T1B, and the lead portion of the second lead member 6B. The equivalent series resistance Rx2 and the equivalent series inductance Lx2 represent the equivalent series resistance and the equivalent series inductance of the metal layer 5 between the cathode of the capacitor element 2' and the cathode terminal T2, and the lead portion of the third lead member 7'.

Figure 17:
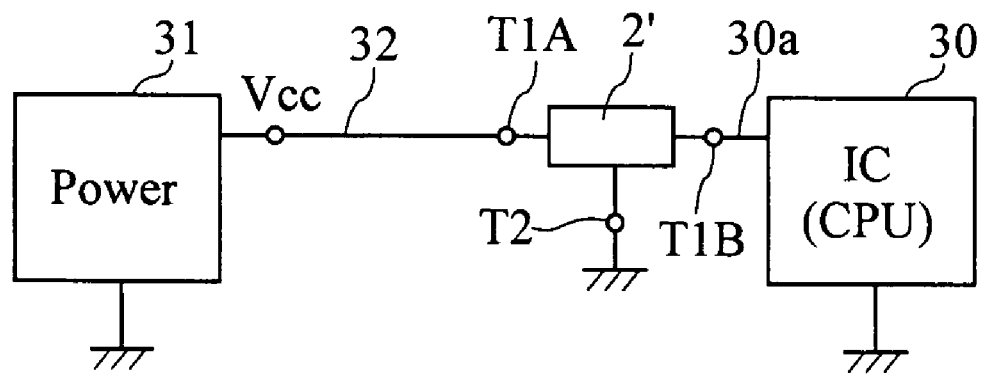
FIG. 17 shows a circuit structure in which the solid electrolytic capacitor according to the fourth embodiment is used for a power supply line.

As shown in FIG. 17, the solid electrolytic capacitor 1C of the fourth embodiment may be arranged on a power supply line 32 between a power supply terminal 30a of an IC 30 such as a CPU and a power supply 31 at a position adjacent to the IC 30. The anode terminal T1A may be connected to the power supply side of the line 32, the anode terminal T1B may be connected to the power supply terminal 30a side of the IC 30, and the cathode terminal T2 may be connected to ground.

In the arrangement shown in FIG. 17, the power supply voltage Vcc outputted from the power supply 31 is inputted to the IC 30 through the power supply line 32, the first and the second lead members 6A, 6B and the anode wire 4' of the solid electrolytic capacitor 1C and the power supply terminal 30a. When high frequency noise is superimposed on the power supply voltage Vcc, the high frequency noise is also transmitted to the IC 30 through the power supply line 32, the first and the second lead members 6A, 6B and the anode wire 4' of the solid electrolytic capacitor 1C and the power supply terminal 30a. However, for the high frequency noise, (the equivalent series inductance LX1A+the equivalent, series inductance LX1B) acts as a choke coil to provide high impedance, so that the high frequency noise is prevented from entering the IC 30.

The residual inductance generated at the lead portion between the anode of the capacitor element 2' and the anode terminal T1A, T1B acts as a choke coil and does not act as an ESL. Therefore, it is considered that the ESL on the anode side does not substantially exist.

The residual inductance generated at the lead portion between the cathode 5 of the capacitor element 2' and the cathode terminal T2 acts as an ESL. However, as noted before, the lead portion comprises the third lead members 7', and the cathode 5 and the cathode terminal T2 are connected to each other via the shortest distance by the wide plate member extending straight. Therefore, the equivalent series inductance Lx2 on the cathode side can be made as low as possible.

Therefore, with the equivalent series resistance Rx2 ignored in FIG. 16, the resonance frequency f0 of the series resonant circuit of the capacitance C of the capacitor element 2' and the cathode terminal T2 serving as a bypass capacitor and the equivalent series inductance Lx2 becomes as high as possible, so that the frequency region in which the decoupling function is effective becomes wide.

The solid electrolytic capacitor 1C of the fourth embodiment can be mounted to a printed board 10 or a laminated board 20 similarly to the solid electrolytic capacitor 1 of the first embodiment. With the mounting method, therefore, the same advantages as those of the solid electrolytic capacitor 1 of the first embodiment can be enjoyed.

In the solid electrolytic capacitor 1C of the fourth embodiment again, the third lead members 7' may be bent to form an obtuse angle in such a manner as shown in FIG. 6. Further, the positioning technique described with reference to FIGS. 7-9 may be employed.

Figure 18:
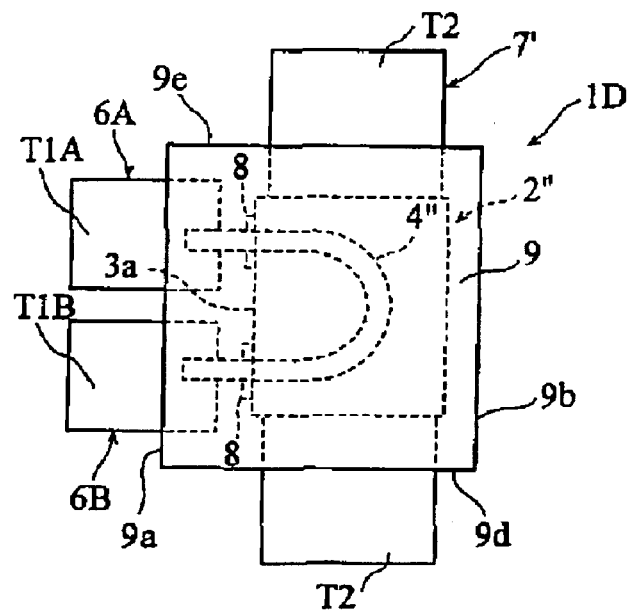
FIG. 18 is a plan view showing a solid electrolytic capacitor according to a fifth embodiment of the present invention.

FIG. 18 is a plan view showing a solid electrolytic capacitor according to a fifth embodiment.

The solid electrolytic capacitor 1D of the fifth embodiment is a variation of the solid electrolytic capacitor of the fourth embodiment. In the solid electrolytic capacitor 1C of the fourth embodiment shown in FIGS. 14 and 15, the anode terminal T1A and the anode terminal T1B are arranged to project from opposite side surfaces 9a and 9b of the resin package 9, i.e., the anode terminal T1A and the anode terminal T1B are aligned. In the variation shown in FIG. 18, the anode terminal T1A and the anode terminal T1B are arranged on the same side surface 9a of the resin package 9 in parallel with each other.

In the solid electrolytic capacitor 1D according to the fifth embodiment, as the anode wire to penetrate through the porous sintered body 3, an anode wire 4" curved into a U-shape is embedded in the porous sintered body 3 so that only opposite ends thereof project from the end surface 3a of the porous sintered body 3. The first lead member 6A and the second lead member 6B are connected to the opposite ends of the anode wire 4". The ends of the lead members 6A and 6B projecting from the side surface 9a of the resin package 9 serve as the anode terminals T1A and T1B, respectively.

The solid electrolytic capacitor 1D of the fifth embodiment has the same advantages as those of the solid electrolytic capacitor 1C of the fourth embodiment.

The present invention being thus described, it will be obvious that the same may be varied in many ways. Such variations are not to be regarded as a departure from the spirit and scope of the present invention, and all such modifications as would be obvious to those skilled in the art are intended to be included within the scope of the following claims.

The invention claimed is:

1. A solid electrolytic capacitor comprising:
a capacitor element including a sintered body of valve metal powder, the sintered body being provided with an anode and a cathode; a package enclosing the capacitor element; a first lead member including a first end connected to the anode, the first lead member extending straight from the anode and including a second end projecting from a side surface of the package; and a second lead member including a first end connected to the cathode and a second end extending straight and projecting from another side surface of the package;
wherein the first lead member and the second lead member extend generally horizontally at a substantially same height from a lower end of the package, and wherein the second end of the first lead member projecting from the package provides an anode terminal for external connection, whereas the second end of the second lead member projecting from the package provides a cathode terminal for external connection.

2. The solid electrolytic capacitor according to claim 1, wherein the first lead member and the second lead member are arranged on a substantially straight line, and wherein the anode terminal and the cathode terminal respectively project from opposite side surfaces of the package.

3. The solid electrolytic capacitor according to claim 1, wherein the anode of the capacitor element comprises a plurality of conductive wires partially embedded in the sintered body through a side surface thereof, the cathode of the capacitor element comprising a metal layer formed on a side surface of the sintered body other than said side surface.

4. A mount structure of a solid electrolytic capacitor as set forth in claim 1 to a board,
wherein the board is formed with a hole or a recess which is larger than an outer configuration of the package, the board including a surface formed with wiring electrodes at positions which are adjacent to the hole or the recess and which respectively face the anode terminal and the cathode terminal when the package is fitted in the hole or the recess, the package of the solid electrolytic capacitor being partially fitted in the hole or the recess, the anode terminal and the cathode terminal being connected to the corresponding wiring electrodes.

5. The mount structure of a solid electrolytic capacitor to a board according to claim 4, wherein an insulating member is loaded in the hole of the board to protect the solid electrolytic capacitor in the hole.

6. A mount structure of a solid electrolytic capacitor as set forth in claim 1 to a board,
wherein the board comprises a multi-layer board having a thickness larger than thickness of the package of the solid electrolytic capacitor and including an upper layer and a lower layer, the board being formed with a hole which is larger, on the upper layer side, than an outer configuration of the solid electrolytic capacitor including the anode terminal and the cathode terminal and slightly larger, on the lower layer side, than an outer configuration of the package, the lower layer including a surface exposed by the hole and formed with wiring electrodes at positions which respectively face the anode terminal and the cathode terminal when the package is fitted in the hole, the package of the solid electrolytic capacitor being entirely fitted in the hole, the anode terminal and the cathode terminal being connected to the corresponding wiring electrodes on the surface of the lower layer.

7. A solid electrolytic capacitor comprising: a capacitor element including a sintered body of valve metal powder with an anode provided by a conductive wire penetrating through the sintered body, the sintered body being provided with a metal layer formed as a cathode on a surface of the sintered body other than a surface at which the conductive wire is exposed; a package enclosing the capacitor element; a first lead member including a first end connected to a first end of the conductive wire, the first lead member extending straight from the conductive wire and including a second end projecting from a side surface of the package; a second lead member including a first end connected to a second end of the conductive wire, second lead member extending straight from the conductive wire and including a second end projecting from a side surface of the package; and a third lead member including a first end connected to the cathode and a second end extending straight and projecting from a side surface of the package;
wherein the first lead member, the second lead member and the third lead member extend generally horizontally at a substantially same height from a lower end of the package, and wherein the second end of the first lead member projecting from the package provides a first anode terminal for external connection, the second end of the second lead member providing a second anode terminal for external connection, the second end of the third lead member providing a cathode terminal for external connection.

8. The solid electrolytic capacitor according to claim 7, wherein the first lead member and the second lead member are arranged on a substantially straight line, wherein the first anode terminal and the second anode terminal respectively project from opposite side surfaces of the package, wherein the third lead member is arranged generally perpendicularly to the first lead member and the second lead member, and wherein the cathode terminal projects from a side surface of the package which is different from the side surfaces from which the first and the second anode terminals project.

9. The solid electrolytic capacitor according to claim 7, wherein the conductive wire is bent into a U-shape within the sintered body and includes opposite ends exposed at a same side surface of the package and connected to the first lead member and the second lead member, respectively.

* * * * *